(12) United States Patent
Maharyta et al.

(10) Patent No.: US 8,729,911 B2
(45) Date of Patent: May 20, 2014

(54) USAGE OF WEIGHTING MATRICES IN MULTI-PHASE SCANNING MODES

(71) Applicant: Cypress Semiconductor Corporation, San Jose, CA (US)

(72) Inventors: Andriy Maharyta, Lviv (UA); Volodymyr Bihday, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/629,437

(22) Filed: Sep. 27, 2012

(65) Prior Publication Data

US 2013/0021294 A1 Jan. 24, 2013

Related U.S. Application Data

(63) Continuation-in-part of application No. 13/247,779, filed as application No. 13/629,437 on Sep. 27, 2012.

(60) Provisional application No. 61/477,128, filed on Apr. 19, 2011, provisional application No. 61/677,663, filed on Jul. 31, 2012.

(51) Int. Cl.
*G01R 27/26* (2006.01)
*G06F 3/044* (2006.01)

(52) U.S. Cl.
USPC ............................ 324/658; 324/659; 324/690

(58) Field of Classification Search
CPC ............................... G06F 3/0416; G06F 3/044
USPC ................................................. 324/658–690
See application file for complete search history.

(56) References Cited

U.S. PATENT DOCUMENTS

| 7,995,036 | B2 | 8/2011 | Perski et al. |
| 8,031,094 | B2 | 10/2011 | Hotelling et al. |
| 8,054,090 | B2 | 11/2011 | Philipp et al. |
| 2007/0075923 | A1* | 4/2007 | Beuker et al. .................. 345/55 |
| 2008/0079699 | A1 | 4/2008 | Mackey |
| 2009/0153152 | A1* | 6/2009 | Maharyta et al. ............. 324/684 |
| 2010/0033196 | A1 | 2/2010 | Hayakawa et al. |
| 2010/0060591 | A1 | 3/2010 | Yousefpor et al. |
| 2010/0073341 | A1 | 3/2010 | Toyooka et al. |
| 2010/0139991 | A1 | 6/2010 | Philipp et al. |
| 2010/0244859 | A1 | 9/2010 | Cormier, Jr. et al. |
| 2010/0295564 | A1* | 11/2010 | Reynolds ...................... 324/686 |
| 2011/0055305 | A1 | 3/2011 | Matsushima |
| 2011/0063154 | A1 | 3/2011 | Hotelling et al. |

(Continued)

FOREIGN PATENT DOCUMENTS

KR 2006132145 A 12/2006

OTHER PUBLICATIONS

Fang, W. (Jul. 2007). "Reducing Analog Input Noise in Touch Screen Systems," Texas Instruments Application Report, 12 pages.

(Continued)

*Primary Examiner* — Melissa Koval
*Assistant Examiner* — Farhana Hoque

(57) ABSTRACT

Apparatuses and methods of driving different transmit (TX) phase sequences of a TX signal on TX electrodes in different sensing stages according to a weighting matrix as the excitation matrix. One method drives the TX signals according to the weighting matrix and measures receive (RX) signals on the RX electrodes to determine if an object is proximate to the electrodes.

20 Claims, 30 Drawing Sheets

(56) References Cited

U.S. PATENT DOCUMENTS

| | | |
|---|---|---|
| 2011/0109568 A1 | 5/2011 | Wu et al. |
| 2011/0163992 A1 | 7/2011 | Cordeiro et al. |
| 2011/0254802 A1 | 10/2011 | Philipp |
| 2012/0013565 A1 | 1/2012 | Westhues et al. |
| 2012/0056841 A1 | 3/2012 | Krenik et al. |

OTHER PUBLICATIONS

Silicon Labs. "How to Minimize Touchscreen Electromagnetic Interference," 7 pages.

Search Report for "Usage of Wighting Matrices in Multi-Phase Scanning Modes", Sep. 2012, 7 pages.

U.S. Appl. No. 13/247,779: "Capacitive Panel Scanning With Reduced Number of Sensing Circuits" Viktor Kremin et al., filed Sep. 28, 2011; 68 pages.

International Search Report for International Application No. PCT/US12/72201 dated Mar. 11, 2013; 2 pages.

USPTO Non Final Rejection for U.S. Appl. No. 13/247,779 dated Oct. 25, 2013; 15 pages.

Written Opinion of the International Searching Authority for International Application No. PCT/US12/72201 mailed Mar. 11, 2013; 9 pages.

International Search Report for International Application No. PCT/IB2011/003284 dated Dec. 30, 2011; 2 pages.

Written Opinion of the International Searching Authority for International Application No. PCT/IB2011/003284 mailed Oct. 19, 2013; 7 pages.

\* cited by examiner

Conventional Tx Scan

Multiphase Tx Convolution

Multiphase Tx Scan

US 8,729,911 B2

USAGE OF WEIGHTING MATRICES IN MULTI-PHASE SCANNING MODES

RELATED APPLICATIONS

This application is a continuation-in-part application of U.S. patent application Ser. No. 13/247,779, filed Sep. 28, 2011, which claims the benefit of U.S. Provisional Application No. 61/477,128, filed Apr. 19, 2011, the entire contents of both are hereby incorporated by reference. This application also claims the benefit of U.S. Provisional Application No. 61/677,663, filed Jul. 31, 2012, the entire contents of all are hereby incorporated by reference.

TECHNICAL FIELD

This disclosure relates to the field of touch sensors and, in particular, to capacitive sensors.

BACKGROUND

In recent years, touch pads, or capacitive sensor devices, have become increasing integrated in various industries and product lines. Due to the increasing popularity of "tablet" personal computers (PCs), there is a growing need for large touch screens.

Ideally, the signals from the sensors in touch screens are received by dedicated receivers at the system controlling the touch screen. However, in larger devices, such an arrangement may be extremely costly and may require an undesirably high amount of space, due to the individual receivers.

BRIEF DESCRIPTION OF THE DRAWINGS

The present invention is illustrated by way of example, and not of limitation, in the figures of the accompanying drawings in which.

DETAILED DESCRIPTION

Figure 1:
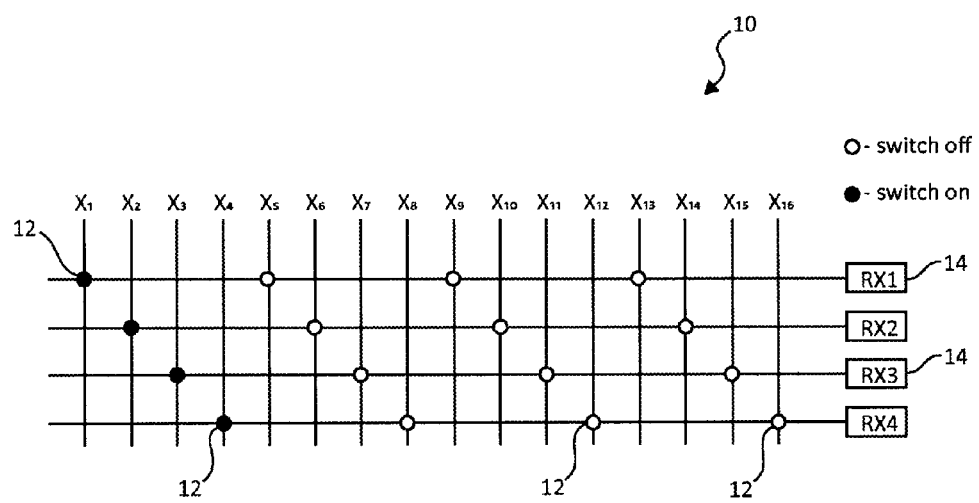
FIG. 1 is a schematic plan view illustrating an embodiment of a capacitive sensor array sensing.

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Various embodiments will now be described that show capacitance sensing systems and methods that listen for noise and alter filtering of sensed values according to a noise level. In particular embodiments, if noise levels are below a certain threshold, indicating the absence of (or low levels of) external noise (i.e., noise localized to a touch area), sensed values can be filtered for common mode type noise. However, if noise levels are above the threshold, sensed valued can be filtered to account for external noise. In particular, embodiments, filtering for localized noise can include a median filter.

In one embodiment, a method for operating a capacitive sensor array is provided. A signal is received from each of a first number of electrodes with a second number of receiver circuits on a controller associated with the capacitive sensor array. The first number is greater than the second number. It is determined if an object is proximate (i.e., within a predetermined proximity of, such as in contact with) to the capacitive sensor array based on the signals received from the first number of electrodes.

The determining if the object is proximate to the capacitive sensor array may include deconvoluting the signals received from the first number of electrodes. The capacitive sensor array may include a plurality of transmitter electrodes and a plurality of receiver electrodes. The first number of electrodes may include all of the plurality of receiver electrodes.

The determining if the object is proximate to the capacitive sensor array may include adjusting the polarity of at least some of the signals received from the first number of electrodes. The determining if the object is proximate to the capacitive sensor array may also include scanning the signals received from the first number of electrodes in a plurality of scanning cycles.

The first number of electrodes may include a plurality of groups of electrodes. During each of the scanning cycles, the polarity of the signals received from one of the groups of electrodes may be adjusted. The polarity of the signal received from each of the first number of electrodes may be adjusted during one of the scanning cycles. The first number of electrodes may include only a portion of the plurality of receiver electrodes.

The plurality of receiver electrodes may include a plurality of groups of receiver electrodes. The determining if the object is proximate to the capacitive sensor array may also include scanning the signals received from the first number of electrodes in a plurality of scanning cycles. During each of the scanning cycles, one of the groups of receiver electrodes may be deactivated.

In another embodiment, a capacitive sensor device is provided. The capacitive sensor device includes a capacitive sensor array and a controller. The capacitive sensor array includes a plurality of capacitive sensors. The controller is coupled to the capacitive sensor array and includes a first number of receiver channels. The controller is configured to activate a second number of the plurality of electrodes on the capacitive sensor array, wherein the second number is greater than the first number, receive a signal from each of the second number of electrodes with the first number of receiver channel, and determine if an object is proximate the capacitive sensor array based on the signals received from the second number of the plurality of electrodes.

In a further embodiment, a method for operating a capacitive sensor array is provided. A first number of electrodes on the capacitive sensor array is activated. The capacitive sensor array includes a plurality of transmitter electrodes and a plurality of receiver electrodes. The first number of electrodes includes all of the receiver electrodes. A signal is received from each of the first number of electrodes with a second number of receiver channels on a controller associated with the capacitive sensor array. The first number is greater than the second number. It is determined if an object is proximate the capacitive sensor array based on the signals received from the first number of electrodes. The determining if the object is proximate to the capacitive sensor array includes adjusting the polarity of at least some of the signals received from the first number of electrodes.

FIG. 1 is a schematic illustration of a touch, or capacitive, sensor array (or device) 10 with a plurality (N) of receive electrodes (RX) (or sensors) a plurality (K) of parallel sensing circuits (also referred to as channels, receivers, or receiver inputs) 14, which form part of a controller (not shown). In the example shown in FIG. 1, as well as those described below, there are sixteen RX electrodes 12 and four sensing channels 14. Although not explicitly shown, each of the lines labeled $X_1$-$X_{16}$ may correspond to a transmitter electrode (TX).

In a conventional receiver channel scanning technique, groups of the receive electrodes 12 are sequentially connected to the receiver inputs 14 through a series of scanning steps. Therefore, each sensor 12 is connected to a receiver input only for fractions of the total columns array scanning time, which may be a very small duration with a large number of electrodes and small number of receive channels. For example, in the example shown in FIG. 1, each receive electrode 12 is connected to a receiver input 14 for 25% of scanning time, resulting in a poor signal-to-noise ratio (SNR).

According to one aspect provided herein, receiving signal integration time increased, thus improving SNR. With integration time increasing by a factor of H, SNR is improved by $\sqrt{H}$ for the white noise model. In one embodiment, more than one receive electrode is connected to the receiver inputs at a time.

A conventional matrix representation for a receiver multiplexing with respect to FIG. 1 is provided below. Different scanning steps may be represented by the following matrix equation for sensors X1, X5, X9, X13:

$$\begin{pmatrix} Rx_1 \\ Rx_2 \\ Rx_3 \\ Rx_4 \end{pmatrix} = \begin{pmatrix} 1 & 0 & 0 & 0 \\ 0 & 1 & 0 & 0 \\ 0 & 0 & 1 & 0 \\ 0 & 0 & 0 & 1 \end{pmatrix} \times \begin{pmatrix} X_1 \\ X_5 \\ X_9 \\ X_{13} \end{pmatrix} \quad (1)$$

or $$Rx = Sr \times X \quad (2)$$

$$Rx = \begin{pmatrix} Rx_1 \\ Rx_2 \\ Rx_3 \\ Rx_4 \end{pmatrix}; X = \begin{pmatrix} X_1 \\ X_5 \\ X_9 \\ X_{13} \end{pmatrix} \quad (3)$$

As such, the matrix, which determines relation between sensor signals and receiver signals, is unity matrix Sr. Similar matrix equations may be provided for remaining sensors. The recovered receive electrodes signals X may be represented as:

$$X = Sr^{-1} \times Rx \quad (4)$$

where Sr−1=Sr for unity matrix.

Embodiments of the present invention provide signal multiplexing techniques for touch sensors, or capacitive sensors, where more than one sensor is simultaneously connected to (or sends signals to) the controller (or receiver or receiver circuits). That is, according to one aspect of the present invention, a signal is received from each of a first number of electrodes with a second number of receiver circuits on a controller associated with the capacitive sensor array. The first number is greater than the second number. It is determined if an object is proximate (i.e., within a predetermined proximity of, such as in contact with) the capacitive sensor array based on the signals received from the first number of electrodes. Various details of exemplary signal multiplexing and deconvolution techniques, which may be used in accordance with various embodiments, are provided below.

In one embodiment, the receiver does not have the capability to change the signal polarity of the input received from the sensors before summing. Such a receiver provides a manner to sum signals from multiple sensors by connecting them together to a common input bus.

In another embodiment, the receiver sums signals from multiple sensors and individually provides a polarity change for each input. Such a receiver may differential inputs, where individual sensors are connected either to the positive or negative receiver inputs.

Figure 2:
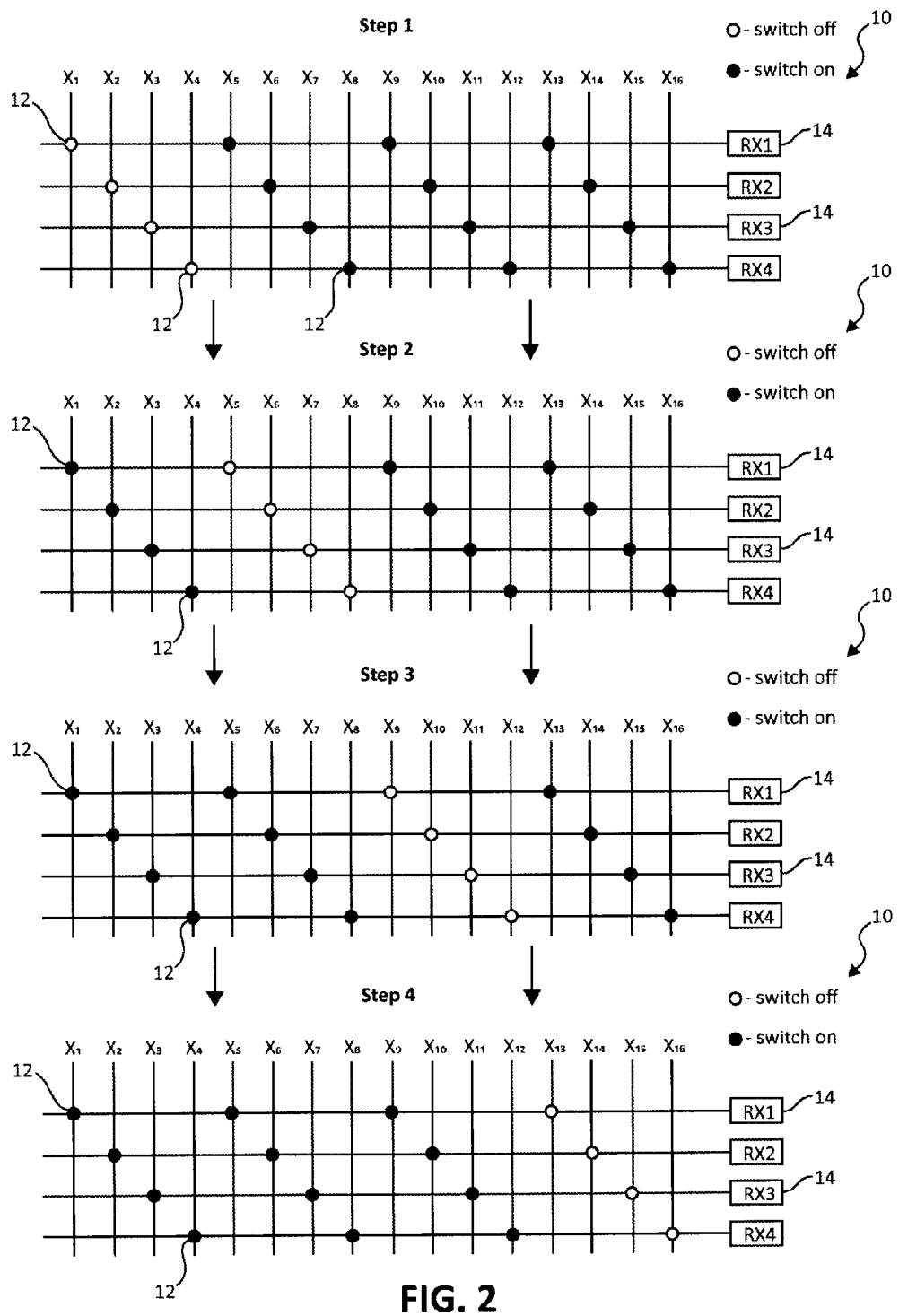
FIG. 2 is a schematic plan view illustrating an embodiment of a method for operating the capacitive sensor array sensing.

One method for scanning the sensor array, which includes connecting multiple electrodes to the receiver inputs, in accordance with one embodiment, is shown in FIG. 2.

The scanning method depicted in FIG. 2 is the "inverse" to the scheme described above with respect to FIG. 1. In the method of FIG. 2, all of the receiver electrodes 12 are connected to the respective receiver channel, except for one of the groups of receive electrodes 12. At each step, the group of electrodes 12 that is not connected to the receiver channels is changed in the manner shown. This multiplexing scheme may be represented by the following matrix Sr:

$$Sr = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \quad (5)$$

The receive electrode signals vector X may be found using Equation 4 by finding the inverse matrix Sr−1, this matrix would be following for this particular case:

$$S^{-1} = \begin{pmatrix} -0.6667 & 0.3333 & 0.3333 & 0.3333 \\ 0.3333 & -0.6667 & 0.3333 & 0.3333 \\ 0.3333 & 0.3333 & -0.6667 & 0.3333 \\ 0.3333 & 0.3333 & 0.3333 & -0.6667 \end{pmatrix} \quad (6)$$

It is possible to estimate the possible SNR change for the proposed sensing scheme. Taking into account that gain factors for both schemes are the same, SNR variation is proportional to the relationship of noise standard deviation after deconvolution for the proposed and conventional sensing techniques.

Filter coefficients, such as for a finite impulse response (FIR) filter, for signal deconvolution are determined by matrix (6) rows, so we can estimate noise standard deviation by passing sample noise via this filter. A white noise model may be used for analysis. Simulation results for this and other different length sequences are provided in Table 1.

TABLE 1

SNR Improvement for Different Receive Electrode Sensing Sequences

| # | Sequence | SNR Improvement, times |
|---|----------|------------------------|
| 1 | 0 1 1   | 1.16 |
| 2 | 0 1 1 1 | 1.13 |
| 3 | 0 1 1 1 1 | 1.11 |
| 4 | 0 1 0 1 1 | 0.90 |

As visible from this table, the white noise improvement is relatively small. However, as described below, other embodiments provide a polarity changing scheme for the signals from the receive electrodes, which show a considerable improvement in SNR.

Figure 3:
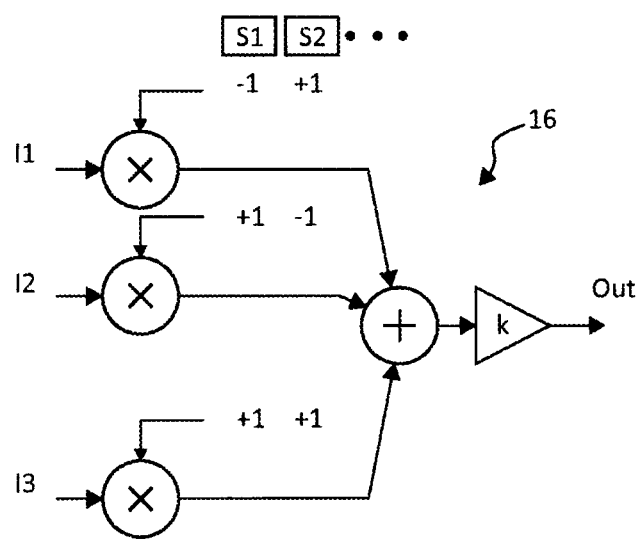
FIG. 3 is block diagram of an embodiment of a multiple inputs receiver for a capacitive sensor device.

FIG. 3 is a block diagram of a receiver 16 according to one embodiment. The receiver 16 shown allows individual signal polarity changes for each input. The current signals from multiple receiver inputs are passed to a summing node in same polarity (marked as multiplication by factor 1) or with inverted polarity (marked as multiplication by factor −1).

Figure 4:
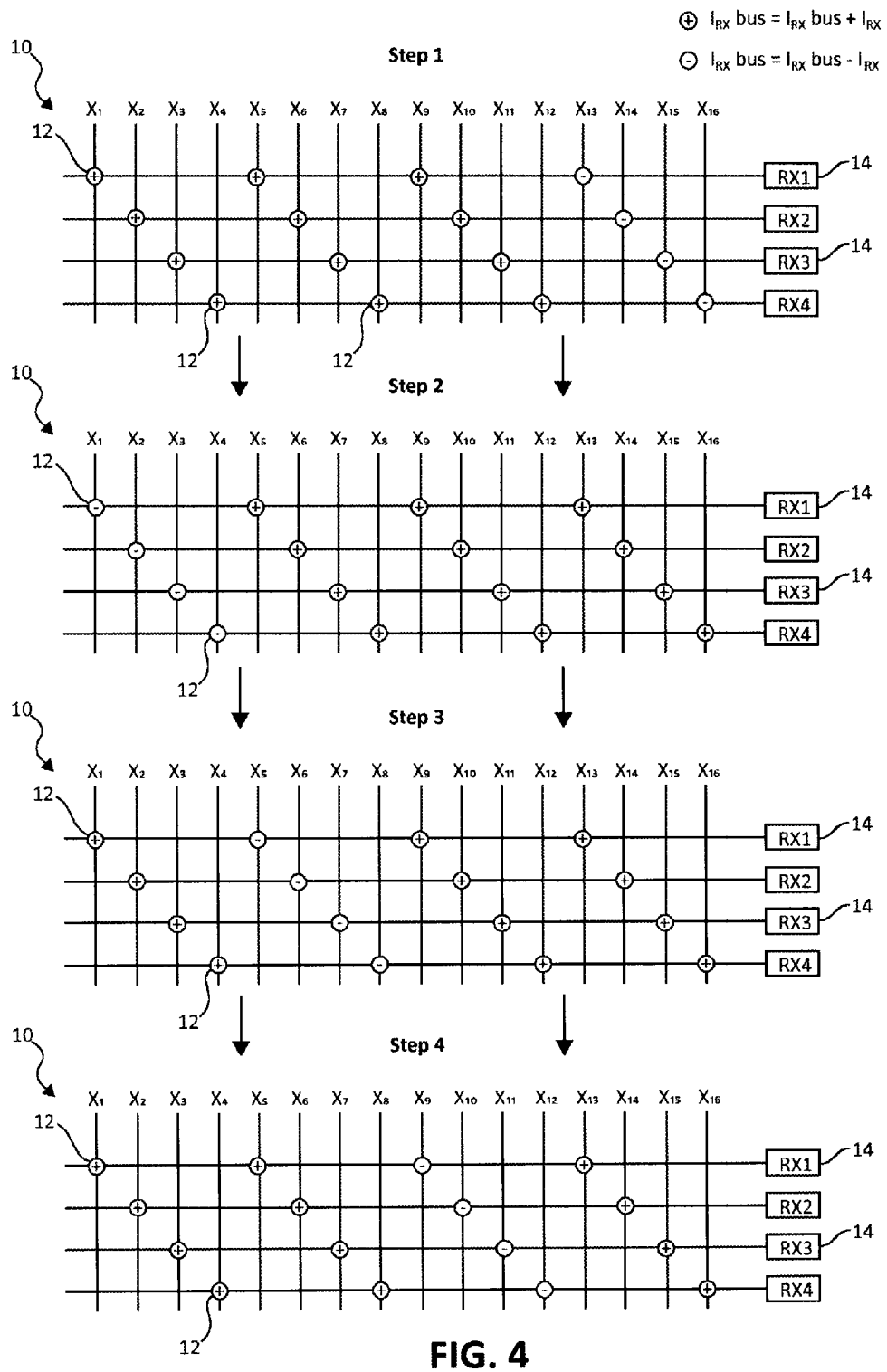
FIG. 4 is a schematic plan view illustrating an embodiment of a method for operating the capacitive sensor array sensing.

An example of such a scanning procedure is shown in FIG. 4. Instead connecting and/or disconnecting receiving electrodes 12 to/from the receiver inputs 14, the polarity of individual receiver signals is changed accordingly to the predefined sequence and scanning step. That is, instead of disconnecting a group of the electrodes at each step, the polarity of the signals received from one of the groups is switched.

If we use the matrix representation (2), the Sr matrix for this scanning configuration may be represented as:

$$Sr = \begin{pmatrix} 1 & 1 & 1 & -1 \\ -1 & 1 & 1 & 1 \\ 1 & -1 & 1 & 1 \\ 1 & 1 & -1 & 1 \end{pmatrix} \quad (7)$$

The inverse matrix Sr−1 for this sequence:

$$Sr^{-1} = \begin{pmatrix} 0.25 & -0.25 & 0.25 & 0.25 \\ 0.25 & 0.25 & -0.25 & 0.25 \\ 0.25 & 0.25 & 0.25 & -0.25 \\ -0.25 & 0.25 & 0.25 & 0.25 \end{pmatrix} \quad (8)$$

By using the previously described SNR change estimation technique and calculating the noise standard deviation relations for the white noise model, it may be determined that this method provides an improvement in the SNR by a factor of 2.

Figure 5:
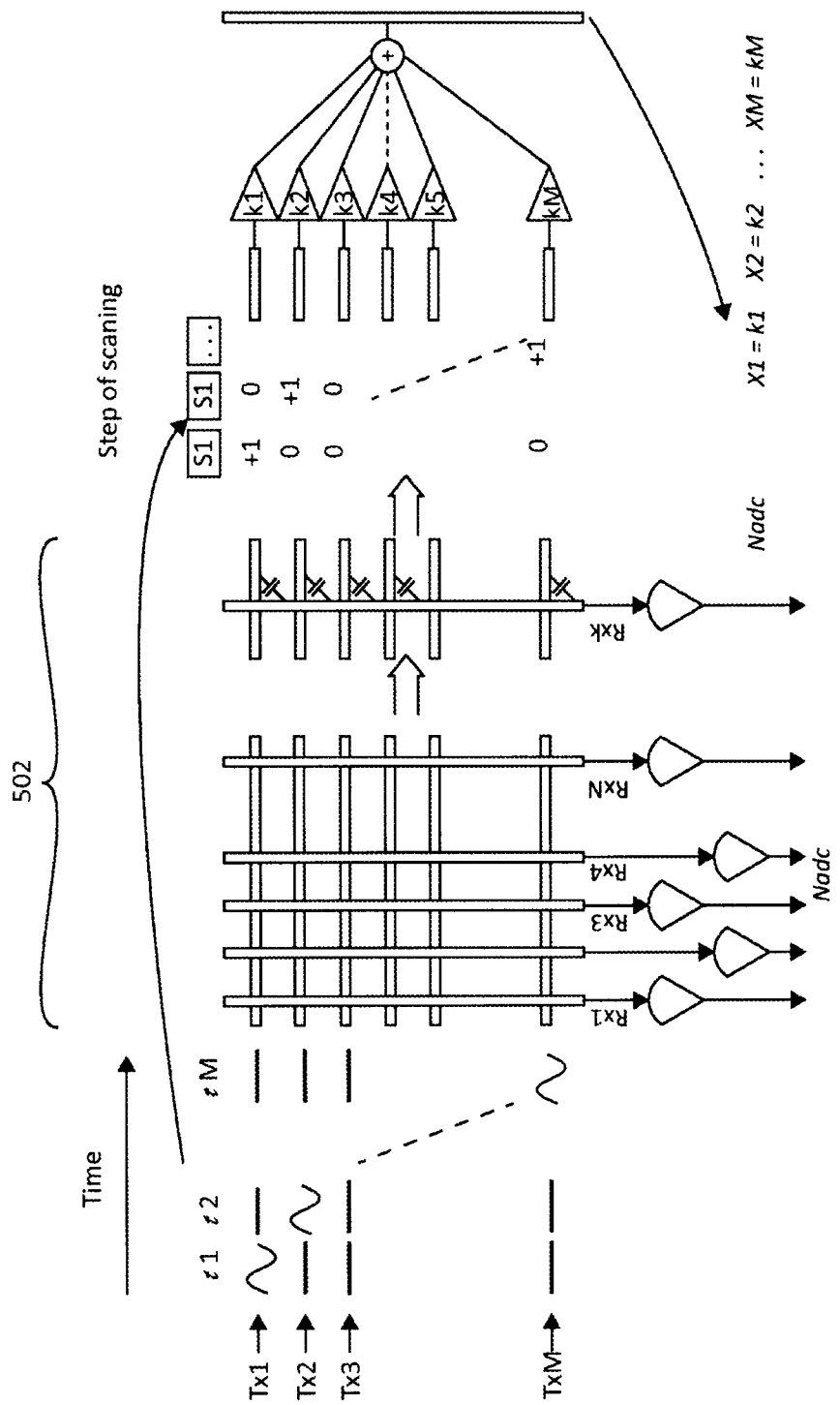
FIG. 5 is a schematic flow chart illustrating a traditional scanning technique.

In a capacitive sensor array with M rows and N columns, the traditional method of sensor matrix scanning includes applying the TX signal to one row and detecting the response from the RX columns. Therefore, the TX signal is applied to the TX electrodes in series between different panel scanning stages, as depicted in FIG. 5. The non-energized TX electrodes 501 are grounded. In FIG. 5, when the TX signal is applied to a TX row, the row is indicated with +1. When the TX electrodes are grounded, they are indicated with 0. Thus, full panel scanning sequence corresponds to the moving "+1" between different TX electrodes during different scanning stages.

The one receiver column may be represented as a capacitive adder for TX excitation signals, passed via panel. As the conventional sequential scanning scheme applies only one TX signal to the one row electrode at same time, the receiver signal is proportional to the mutual capacitance between the excited row and receiver column only 502. This signal after rectification and analog-to-digital converter (ADC) conversion may be represented as some $N_{ADC}$ value.

The gain factor between j-row and i-column may be represented as kji, where k is proportional to the mutual capacitance between row and column.

$$K = \begin{bmatrix} k_{11} & k_{12} & \ldots & k_{1N} \\ k_{21} & k_{22} & \ldots & k_{2N} \\ \ldots & \ldots & \ldots & \ldots \\ k_{M1} & k_{M2} & \ldots & k_{MN} \end{bmatrix} \quad (9)$$

As the TX signal is applied in series to the all panel rows, the elements of this matrix are obtained on a row-by-row basis, synchronously with applying TX signal to the corresponding row. This may be explained in the following equations:

$$V_{kj} = \delta_{kj}, \forall k \in \overline{1, M} \quad (10)$$

$$\delta_{kj} = \begin{cases} 1 & k = j \\ 0 & k \neq j \end{cases}$$

where $V_{kj}$ is the TX signal for j row for the k scanning stage. For the entire panel scanning procedure, the TX signals may be represented by the following diagonal matrix with M*M dimensions:

$$S = \begin{bmatrix} 1 & 0 & \ldots & 0 \\ 0 & 1 & \ldots & 0 \\ \ldots & \ldots & \ldots & \ldots \\ 0 & 0 & \ldots & 1 \end{bmatrix} \quad (11)$$

Each receiver represents signals, coming from multiple TX electrodes, it can be written in the following form for the i-column receiver output signal and j-scanning stage:

$$N_{ADCij} = \sum_{k=1}^{M} k_{ik} S_{kj} \quad (12)$$

As a matrix, it may be expressed as $$N_{ADC} = K \cdot S \quad (13)$$

Taking into account the S is diagonal matrix, the linear equations set (13) may be simplified to the following $$k_{ij} = N_{ADC\,ij}, \forall i \in \overline{1,N}, \forall j \in \overline{1,M} \quad (14)$$

Thus, calculating gain is directly proportional to the ADC readings and do not require any additional computations. If there are N receivers, all columns are sensed at same time. If one row scanning time is $\tau$, the total panel scanning time $T_P$ is:

$$T_P = \tau M \quad (15)$$

For the panels with a large number of TX electrodes, single row scanning time is a small fraction the total panel scanning time. Thus, the row capacitances are measured during very short time interval, resulting in SNR degradation due to the limited number of TX cycle processing for the one row scanning. Another disadvantage of using the short conversion time is receiver bandwidth increasing, causing the external noise immunity degradation.

Details of a TX multiphase scanning method will now be described. It is desirable to receive row signals during whole panel scanning time $T_P$. This may be achieved by applying TX signals to more than one row at the same time. If the same TX signals are applied to all TX electrodes, touch detection only in one coordinate may be implemented. In order to recover each row-column intersection mutual capacitance value (or full matrix K), properties of the individual TX signal may be changed at the different scanning stages to distinguish signals at different scanning phases and to resolve multiple touches. The following TX signal properties may be changed: amplitude, phase and frequency.

Figure 6:
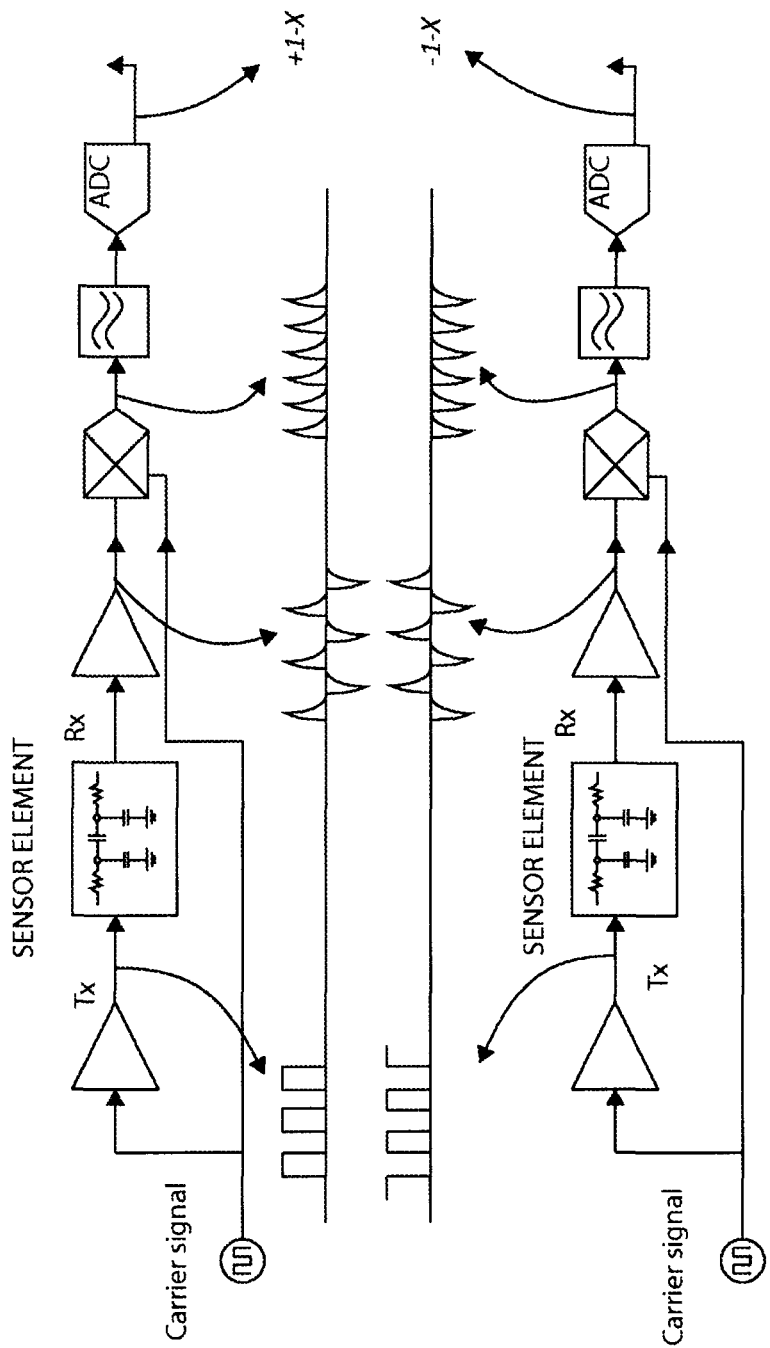
FIG. 6 is a schematic block diagram illustrating a traditional single phase scanning technique using the synchronous demodulation.

A simple and easy way to implement this in the digital domain is binary phase modulation. In this case, each TX electrode may be driven either in-phase with the demodulation signal, or with the opposite phase as the demodulation signal. FIG. 6 illustrates one sensing channel and one excited row using such a method.

As shown in FIG. 6, using opposite phase signals results in an inverted ADC response. For the following explanations, the binary phase modulation may be represented by the TX signal multiplication by scalar factor +1 or −1.

Figure 7:
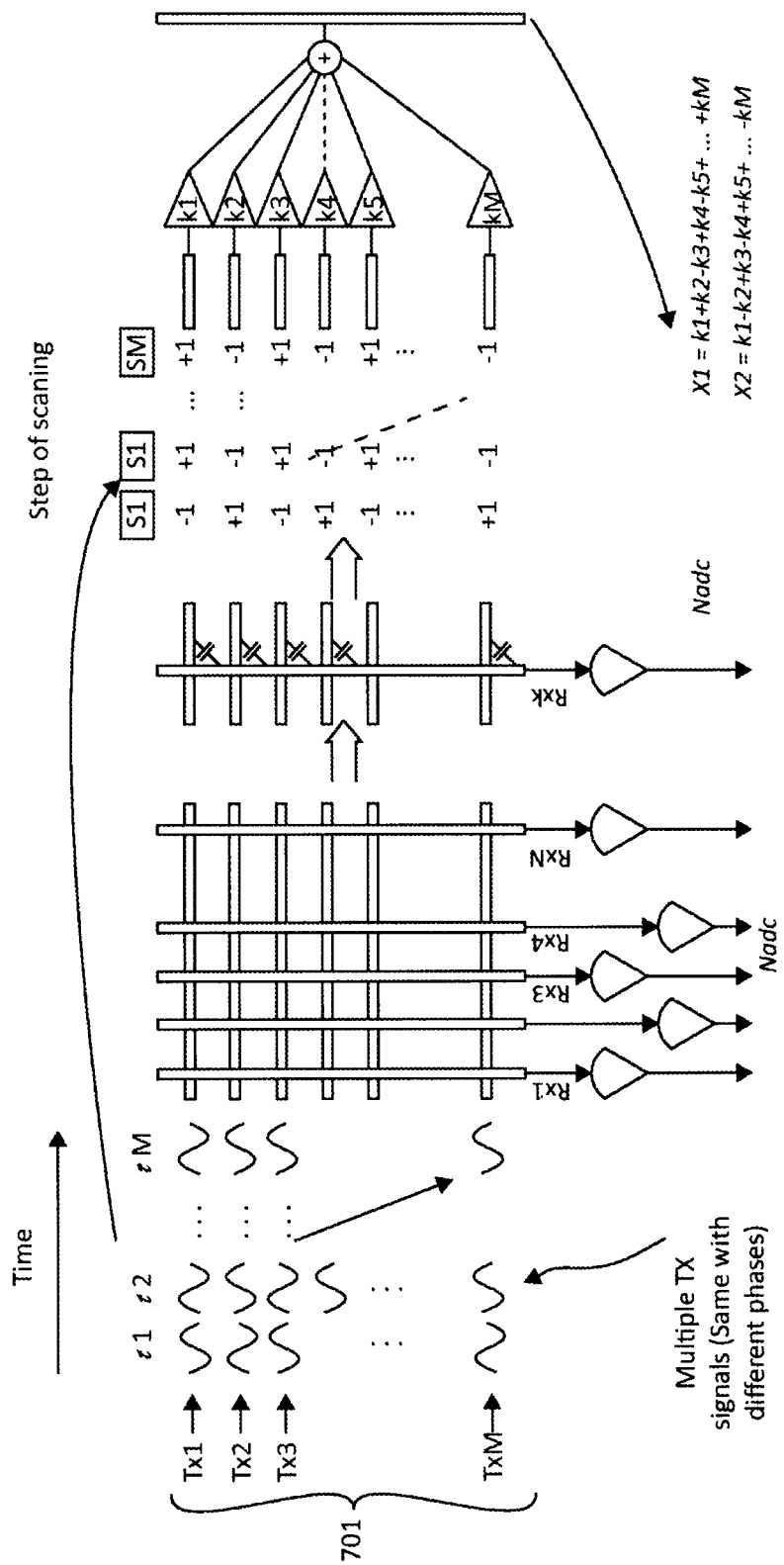
FIG. 7 is a schematic flow chart illustrating a multi-phase scanning technique.

In general, the method includes applying different TX phase sequences for different sensing stages and collecting channel readings for each stage. FIG. 7 illustrates a scanning sequence example. If multiple TX signals are driven simultaneously, the receiver signal is the algebraic sum of the signals received from the different TX electrodes 701.

If the i TX electrode phase for the j scanning stage is equal to $F_{ij}$, $F_{ij}$ may accept only two values: $F_{ij}=1$ for the in-phase excitation and $F_{ij}=-1$ for the opposite phase excitation signals, as all TX electrodes are activated at same time. The F in the matrix form may be represented in the following way:

$$F = \begin{bmatrix} f_{11} & f_{12} & \cdots & f_{1N} \\ f_{21} & f_{22} & \cdots & f_{2N} \\ \cdots & \cdots & \cdots & \cdots \\ f_{M1} & f_{M2} & \cdots & f_{MM} \end{bmatrix} \quad (16)$$

There is easy to find the gain matrix K for the scanning sequence of phase modulated TX signals. By substituting the F matrix to the Equation 13 instead matrix S, the following linear equations set is obtained:

$$N_{ADC} = K \cdot F \quad (17)$$

By resolving the equation set (16) for the gain matrix K:

$$K = N_{ADC} \cdot F^{-1} \quad (17)$$

where F−1 is the inverse matrix for matrix F, which may be determined by any known method at the device design time, as matrix coefficients are constants and do not change during system operation.

The computational requirements for Equation 18 may easily be estimated: the NADC is N*M matrix, and F−1 is M*M matrix. Thus, matrix multiplication requires N*M² MAC operations. For a panel with M=16 and N=11, 2816 MAC operations are required for each scanning cycle.

Details of phase modulation function selection will now be described.

The F matrix coefficients may be selected in multiple ways to form the non-singular matrix. There are several criterion which may be used for the phase modulation function selection: the matrix may be a definite matrix for getting a stable linear set solution, the matrix coefficients determine the filter properties of the system, so matrix may be selected in such way to get best filtering properties, and the receiver input current when the touch sensor is not being touched should be minimized.

There are multiple ways for filling the matrix. One of the possible ways is selecting a function as a pseudorandom sequence of the +1, −1 and rotating this sequence for the complete matrix filling. For example, if we select the following sequence, for M=10:

$$\overline{F_V} = [-1,+1,-1,-1,+1,+1,-1,-1,-1,+1,] \quad (19)$$

The full matrix F may be filled by the cyclic rotation of $F_V$ sequence:

$$F = \begin{pmatrix} -1 & 1 & -1 & -1 & 1 & 1 & -1 & -1 & -1 & 1 \\ 1 & -1 & 1 & -1 & -1 & 1 & 1 & -1 & -1 & -1 \\ -1 & 1 & -1 & 1 & -1 & -1 & 1 & 1 & -1 & -1 \\ -1 & -1 & 1 & -1 & 1 & -1 & -1 & 1 & 1 & -1 \\ -1 & -1 & -1 & 1 & -1 & 1 & -1 & -1 & 1 & 1 \\ 1 & -1 & -1 & -1 & 1 & -1 & 1 & -1 & -1 & 1 \\ 1 & 1 & -1 & -1 & -1 & 1 & -1 & 1 & -1 & -1 \\ -1 & 1 & 1 & -1 & -1 & -1 & 1 & -1 & 1 & -1 \\ -1 & -1 & 1 & 1 & -1 & -1 & -1 & 1 & -1 & 1 \\ 1 & -1 & -1 & 1 & 1 & -1 & -1 & -1 & 1 & -1 \end{pmatrix} \quad (20)$$

The inverse matrix may be expressed as $$F^{-1} = \begin{pmatrix} -0.1932 & -0.0795 & -0.2386 & -0.2159 & -0.1477 & 0.0568 & 0.1705 & 0.0114 & 0.0341 & 0.1023 \\ 0.1023 & -0.1932 & -0.0795 & -0.2386 & -0.2159 & -0.1477 & 0.0568 & 0.1705 & 0.0114 & 0.0341 \\ 0.0341 & 0.1023 & -0.1932 & -0.0795 & -0.2386 & -0.2159 & -0.1477 & 0.0568 & 0.1705 & 0.0114 \\ 0.0114 & 0.0341 & 0.1023 & -0.1932 & -0.0795 & -0.2386 & -0.2159 & -0.1477 & 0.0568 & 0.1705 \\ 0.1705 & 0.0114 & 0.0341 & 0.1023 & -0.1932 & -0.0795 & -0.2386 & -0.2159 & -0.1477 & 0.0568 \\ 0.0568 & 0.1705 & 0.0114 & 0.0341 & 0.1023 & -0.1932 & -0.0795 & -0.2386 & -0.2159 & -0.1477 \\ -0.1477 & 0.0568 & 0.1705 & 0.0114 & 0.0341 & 0.1023 & -0.1932 & -0.0795 & -0.2386 & -0.2159 \\ -0.2159 & -0.1477 & 0.0568 & 0.1705 & 0.0114 & 0.0341 & 0.1023 & -0.1932 & -0.0795 & -0.2386 \\ -0.2386 & -0.2159 & -0.1477 & 0.0568 & 0.1705 & 0.0114 & 0.0341 & 0.1023 & -0.1932 & -0.0795 \\ -0.0795 & -0.2386 & -0.2159 & -0.1477 & 0.0568 & 0.1705 & 0.0114 & 0.0341 & 0.1023 & -0.1932 \end{pmatrix} \quad (21)$$

In Equation 21, one may observe interesting properties of the inverse matrix, formed by the cyclic rotation of the sequence expressed in Equation 19: inverse matrix coefficients are obtained by the cyclic rotation of the one matrix row or column, requiring the minimum read-only memory (ROM) area for storage. This matrix may be normalized to be implemented on the integer computation central processing unit (CPU).

It is interesting to select the $F_V$ in such way it gives best distinguishes between different operation phases. Using the phase modulation sequence is close to the pseudo-random process, and cyclic process time shift allows for obtaining the phase modulation sequences, which have minimum cross-correlation functions and provide stable solution of the linear Equation 18. So, the cross-correlation coefficient between different phase modulation sequences may be much smaller than autocorrelation function peak. As it is proposed to use cyclic phase modulation sequence rotation, this sequence autocorrelation function may have the largest single peak and minimum side peaks.

Also, with programmable polarity change receivers we would be able to limit the total receiver current to acceptable values.

The polarity modulation sequence is selected to the maximum possible length for given number of the receive electrodes and number of sensing channels. If the array has N receiving electrodes and K parallel receivers, and the number of receiving electrodes is an integer multiple of the number of channels count, and if we the total RX columns scanning time to is fixed to $T_C$, each receiver gets time slot TR:

$$T_R = T_C \frac{K}{N} \quad (22)$$

The receiver SNR $A_S$ is proportional to the square root of integration time $T_C$:

$$A_S = \sqrt{\frac{T_R}{T_0}} \quad (23)$$

where $T_0$ is a scaling factor. When phase modulation sequence is applied, SNR improvement is approximately equal to the square root of the sequence length, L:

$$A_G \approx \sqrt{L} \quad (24)$$

The sequence maximum length is selected to be equal to the relation of the sensing electrodes to number of receivers:

$$L = \frac{N}{K} \quad (25)$$

After RX signal deconvolution is applied, the sensor SNR ADC would be equal to:

$$A_{DC} = A_S \cdot A_G \quad (26)$$

By combining (26), (24), (23) and (22), the following equation can be derived:

$$A_{DC} \approx \sqrt{\frac{T_C}{T_0}} \quad (27)$$

Equation (27) demonstrates that SNR does not depend from the number of parallel sensing channels if the receive column scanning time is fixed. Table 2 Error! Reference source not found. illustrates tabulated data for several array examples.

TABLE 2

Panel and System Configuration Examples

| # RX Electrodes | # Receivers | Columns Scanning Time | Time per slot | SNR (standard) | Sequence Length | SNR Impr. Times* | SNR (RX deconvolution) |
|---|---|---|---|---|---|---|---|
| 16 | 36 | 1 $T_C$ | 1 $T_C$ | 1.00 A | 1 | 1.00 | 1.00 A |
| 16 | 4 | 1 $T_C$ | 0.25 $T_C$ | 0.50 A | 4 | 2.00 | 1.00 A |
| 16 | 2 | 1 $T_C$ | 0.125 $T_C$ | 0.35 A | 8 | 2.45 | 0.87 A |
| 32 | 32 | 1 $T_C$ | 1 $T_C$ | 1.00 A | 1 | 1.00 | 1.00 A |
| 32 | 8 | 1 $T_C$ | 0.25 $T_C$ | 0.50 A | 4 | 2.00 | 1.00 A |
| 32 | 4 | 1 $T_C$ | 0.125 $T_C$ | 0.35 A | 8 | 2.45 | 0.87 A |
| 32 | 2 | 1 $T_C$ | 0.0625 $T_C$ | 0.25 A | 16 | 3.45 | 0.86 A |
| 64 | 64 | 1 $T_C$ | 1 $T_C$ | 1.00 A | 1 | 1.00 | 1.00 A |

TABLE 2-continued

Panel and System Configuration Examples

| # RX Electrodes | # Receivers | Columns Scanning Time | Time per slot | SNR (standard) | Sequence Length | SNR Impr. Times* | SNR (RX deconvolution) |
|---|---|---|---|---|---|---|---|
| 64 | 16 | 1 $T_C$ | 0.25 $T_C$ | 0.50 A | 4 | 2.00 | 1.00 A |
| 64 | 8 | 1 $T_C$ | 0.125 $T_C$ | 0.35 A | 8 | 2.45 | 0.87 A |
| 64 | 4 | 1 $T_C$ | 0.0625 $T_C$ | 0.25 A | 16 | 3.45 | 0.86 A |

The proposed technique works well together with multiphase TX technique. Moreover, order in which RX multiphase and TX multiphase scanning is applied is not important and may be selected based on implementation flexibility or optimization demands.

Given a sensor array with N RX and M TX lines, the sensor array imaged with a matrix of gain Gs where each element of matrix image is gain between TX and R X lines, Suppose TX sensors excitation done using M-th elements sequence. The TX signals phase patterns changes on each scanning step and forms an excitation matrix Ex. These matrixes columns contain images of phase pattern of excitation signals applied to the TX lines in the individual scanning steps. The images of signals on RX lines coming while scanning cycles forms a matrix:

$$X = Gs \times Ex \quad (28)$$

The columns of vector X correspond to images of signals, which are received by the receiver inputs in each of the scanning cycles. Suppose the measuring channel contain the one receiver with N inputs and polarity switching circuit for each input. The receiver input signals polarity is alternated for the each step of the multiphase RX scanning. The rules of polarity changing of inputs signals are described by matrix Sr. Rows of this matrix contain images of input signals for each RX scanning step. The dimensions of this matrix are N×N. Measuring results after complete scanning cycle are:

$$Y = Sr \times X = Sr \times Gs \times Ex \quad (29)$$

If it is assumed that matrixes Ex and Sr are singular, it is possible to find the inverse matrixes. In this case, the sensor gain matrix results as:

$$Gx = Sr^{-1} \times Y \times Ex^{-1} \quad (30)$$

It should be noted that the order of scanning is not essential in TX and RX multi-phase scanning. The same results are obtained when applying complete TX scanning cycle for each RX scanning step or applying multiple RX scanning cycles for same TX signals combination.

Portions a-f of FIG. 8, or FIGS. 8*a*-8*f*, provide a visual summary of the different scanning techniques.

Figure 8A:
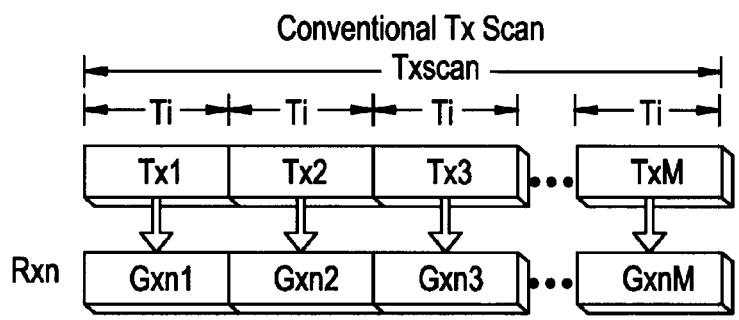
FIG. 8 is a schematic block diagram that provides a visual summary of different scanning techniques.

FIG. 8*a* illustrates conventional scanning. Over a period of conventional scanning, each TX line is excited separately and the sensor panel responses with integral value measures over a period of time Ti. It is necessary to scan all TX lines over a period of time M·TR. The conversion results is image sensors gains on RXn lines.

Figure 8B:
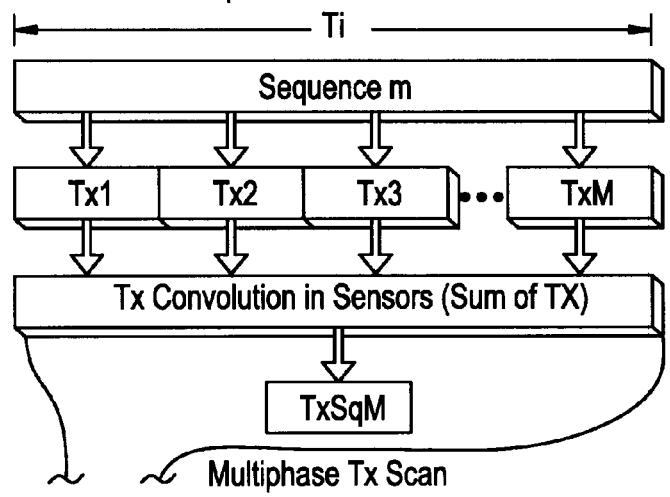
Figure 8C:
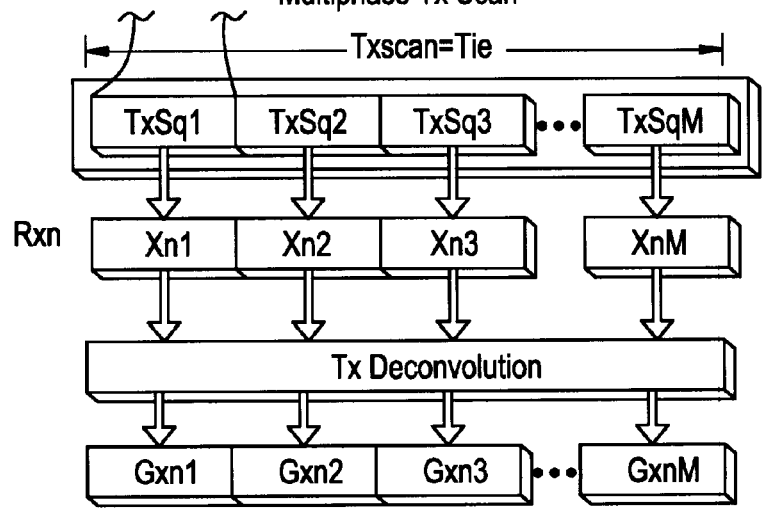

FIG. 8*b* illustrates when the TX lines are excited simultaneously with phase alternating in accordance with the chosen sequence. The sensor panel then convolves individual sensor responses. This response is measured over a period of time $T_R$ as in conventional scanning. The M measuring results Xn stored after M multiphase scanning steps. Deconvolution procedure processed the whole of measured responses for each sensor's gain reconstruction. Obtained in this way result looks as each sensor's gross-gain measured over a period of time equal conventional scanning time Tp.

Figure 8D:
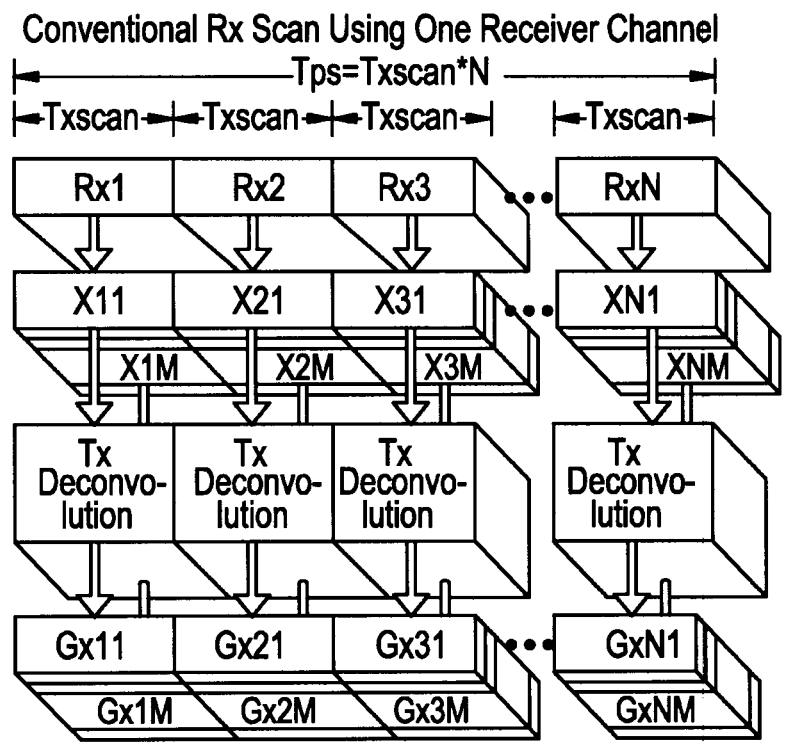

Consider a procedure of scanning sensors panel containing M TX lines and N RX lines. In FIG. 8*d*, the system includes one measuring channel with multiphase TX line scanning, and each RX line is sensed separately. The complete sensor panel scanning requires N RX scanning cycles. In practice, an application requires limited value of panels scanning time. Thus, increasing the panel size leads to the measuring time decreasing and to SNR degradation. This problem may be solved using a several measuring channels in parallel. However, this does not solve the problem of noise immunity with large sensor panels.

Figure 8E:
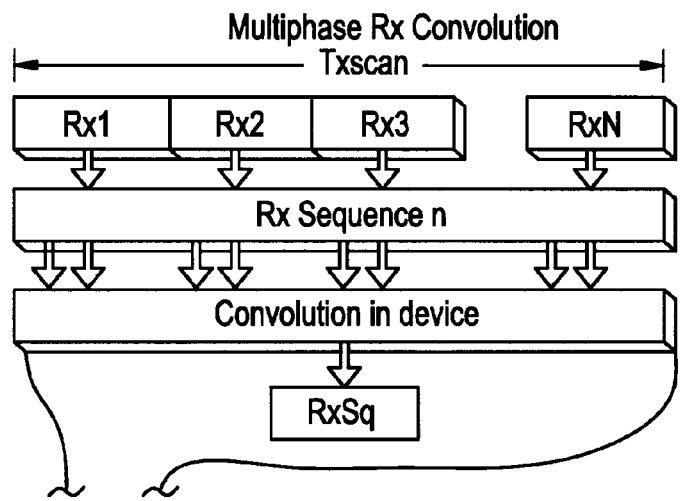

FIG. 8*e* illustrates RX input signal convolution. The RX signals are convolved using the different phase sequence for the each RX scanning step. One of the RX scanning steps is performed over the TX line scanning time. Therefore, the response contains responses of the entire panel cross-gain. This operation repeats N times while the all RX lines may be scanned with the original vector at each RX scanning step. The results of measuring of RX convolutions responses form the matrix Y. The RX deconvolution procedure correlates the Y matrix columns with the RX solving matrices rows and stores results as the X matrix.

Next, the TX deconvolution procedure correlates the X matrixes rows with the TX solving matrixes columns and stores the reconstructed images of the panels cross-gains. Whereas the restored sensor gain calculations include responses from the all sensor crosstalk and operates with the all data obtained on the M×N scanning steps, the equivalent measuring time is roughly comparable with panels scanning time.

Figure 8F:
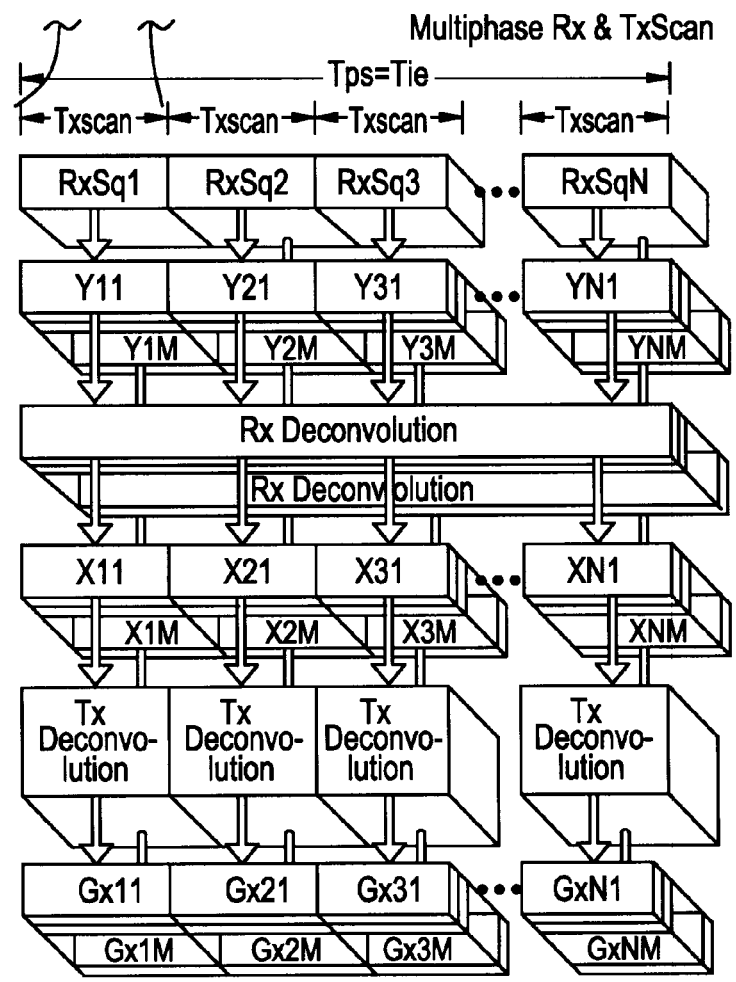

FIG. 8*f* illustrates how the multiphase RX and multiphase TX techniques work together.

Simulated data for combined multiphase RX and TX methods operation will now be discussed. In an array with 16 RX lines and 11 TX lines, untouched sensors have a gain equal to 10 and the two touches placed on the panel. The sensing system applies 11 elements multiphase excitation on TX lines using reference vector cyclic rotation for form sequence in each scanning step.

Suppose there are four conversion channels with the four RX lines summing circuit and programmmable polarity inversion circuit. Sixteen RX electrodes divided between on four slots and slot's Rx lines are connected to the conversion channels inputs. The RX signals phase alternating is performed using reference vector ScV=[1 1 1 −1] and vector rotates cyclically at each RX scanning step. The order of the scanning is four step of RX scanning (Rx scanning cycle) performed on each TX scanning step. The SNR improvement for given RX phase sequence is 2, so total SNR improvement for combination of the multiphase RX and TX techniques and equal approximately 6 in our case.

It is easy to see the significant increasing of no informative level of measured signal. This level is proportional to the product of sum of sequences elements used for LX and TX scanning. In this case, this product is equal to 6.

TABLE 3

Conventional vs. Multi-RX/Multi-TX and Combined Multi TX/RX Techniques.

| Item | Traditional method | Multi-RX w/o polarity switching | Multi-RX with polarity switching | Multi TX | Multi-RX with polarity change + multi-TX |
|---|---|---|---|---|---|
| TX driver(s) current | $I_{TX}$ | $I_{TX}$ | $I_{TX}$ | $\approx M * I_{TX}$ | $\approx M * I_{TX}$ |
| Receiver current | $I_{RX}$ | $\geq 2\ I_{RX}$, RX phase sequence dependent | $\geq 2\ I_{RX}$, RX phase sequence dependent | $\geq 2\ I_{RX}$, TX phase modulation function dependent | $\geq 4\ I_{RX}$, RX/TX phase sequence dependent |
| SNR | A | $\approx 1.15$ A | $\approx A \sqrt{N/K}$ * | $\approx A \sqrt{M}$ | $\approx A \sqrt{M \cdot N/K}$ * |
| MAC operations | none | $N^2 * M/K$ | $N^2 * M * /K$ | $N * M^2$ | $N^2 * M/K + N * M^2$ |
| Panel scanning time | $T_R * M * N/K$ | $T_R * M * N/K$ | $T_R * M * N/K$ | $T_R * M * N/K$ | $T_R * M * N/K$ |

Table 3 lists the results of various scanning techniques, in which N is the number of RX electrodes, M is number of TX electrodes, K is number of receivers, the RX sequence length is selected to maximum for given number of receivers, and TR is the scanning time for one scan slot.

Figure 9:
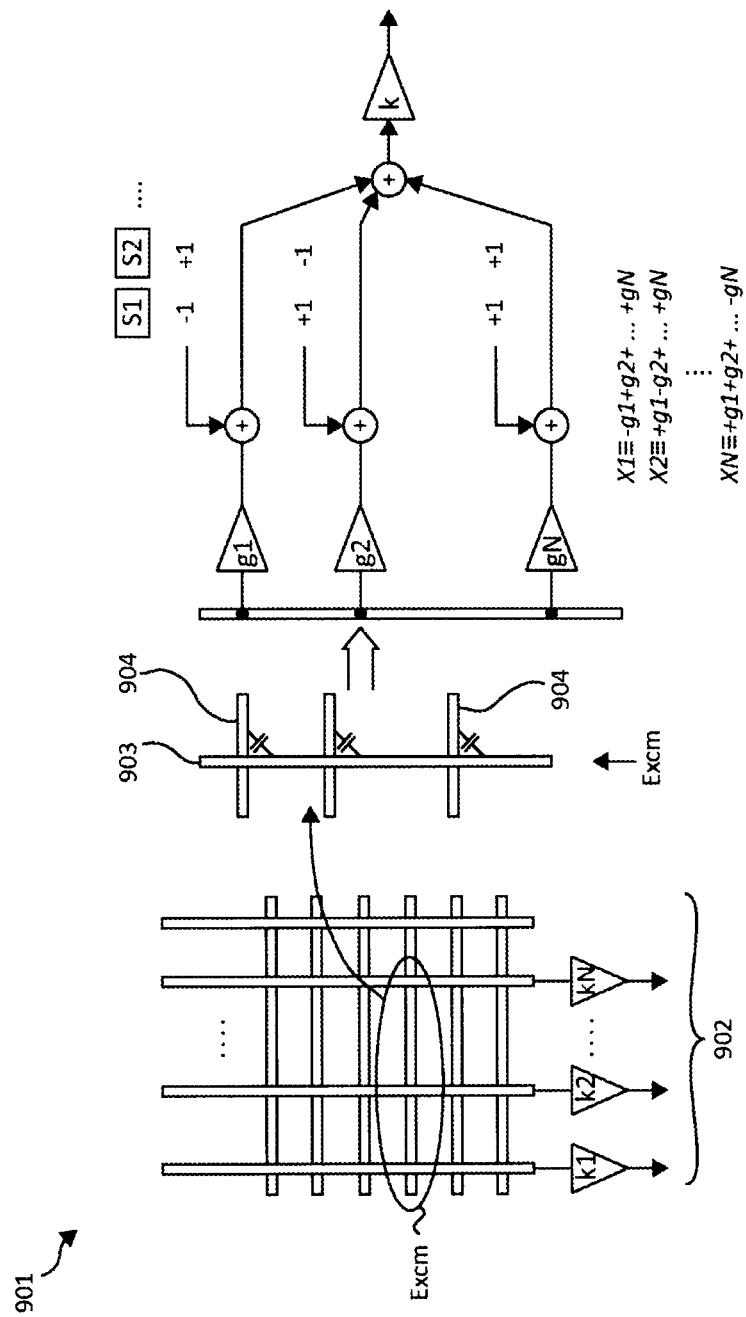
FIG. 9 is a block diagram illustrating convolution of signals in one embodiment.
Figure 10:
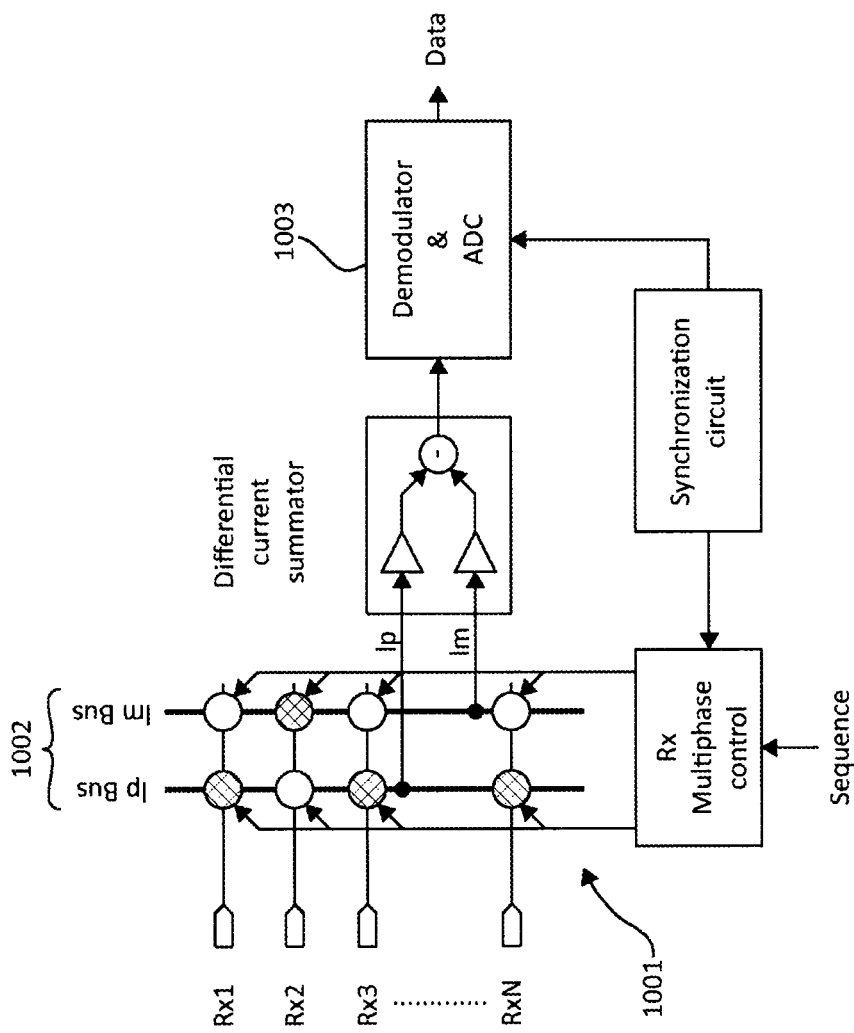
FIG. 10 is block diagram of an embodiment of a receiver for a capacitive sensor device.

The FIG. 9 and FIG. 10 demonstrate how convolution on the input of measuring channel operates. The RX convolution operates with the multi-TX method by summation of signals collection which phases are accordance with preset rules. However, if in TX multiphase, summation is provided by the sensors panel, the RX multiphase performs signals summing at input of measuring channel. The phase change may be done with input signal polarity alternating.

It should be noted that the input signal from a sensor's panel is current and a summation of currents may be readily performed. It is necessary to join currents inputs on one node with low input impedance. So we can use receivers with two nodes for non-inverted Ip and inverted Im signals connecting to a differential current summator. Convolution sequence controlled with Rx Multiphase control circuit using Rx inputs connection to the Ip and Im nodes (buses). In this way, convolved signals go to the measuring channel for processing.

FIG. 9, on the left side, schematically illustrates a touch panel 901 and an array of receivers 902 connected to each sense electrode. This reflects a standard scanning technique where each electrode is handled by one receiver. On the right side of FIG. 9, there is one TX electrode 903 and signals coming to the receiver from multiple RX lines 904 with different gains g1 . . . gN. The signal from each line is multiplied by factor +1 or −1 and summed together. This reflects the multi-RX implementation.

FIG. 10 shows one possible implementation of the multi-RX technique. This implementation is based on using a differential current input receiver 1001 and two analog buses 1002 for handling different polarity input signals. The receiver out signal is equal to the difference of the input currents (Ip and Im). The receiver output signal is demodulated and sampled by ADC 1003.

Suppose a sensing system measures a panel's mutual capacitance using an excitation source with rectangular voltage waveform and pulse duration ensures complete mutual capacitance recharging. Then charge transferred from the excitation source to the measuring channel can estimate as:

$$Qcm = Uex \cdot Cm \qquad (31)$$

where Uex is the excitation sources voltage and Cm is the sensors mutual capacitance, The following paragraphs discuss different options for the differential current input stage, implemented conventional operation amplifiers, current conveyers, etc.

Figure 11:
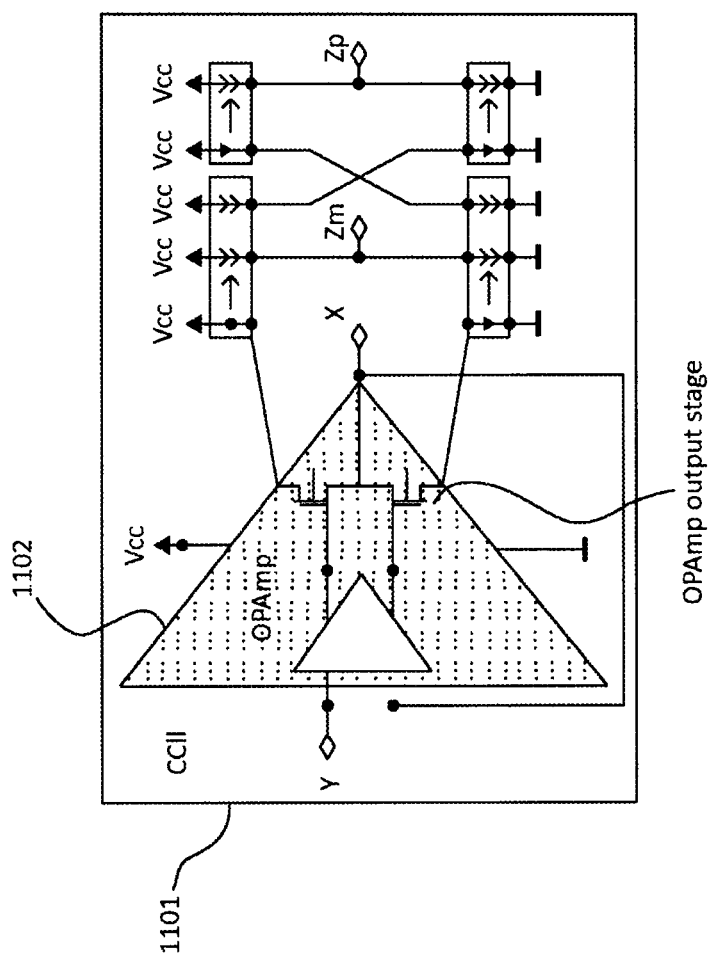
FIGS. 11-20 are block diagrams of embodiments of an input stage of a receiver for a capacitive sensor device.

Referring now to FIG. 11, in general a current conveyor (CCII) 1101 contains an operational amplifier (OPAmp) 1102 with class A-B output stage and current mirrors with a sensing circuit connected serially with top and bottom branches of operational amplifiers output stage. The operational amplifier is configured as voltage repeater and keeps voltage on the terminal X equal to the voltage on terminal Y. If some source excites a current flow in the terminal X this current is mirrored on terminal Zp directly and on terminal Zm inversely.

Figure 12:
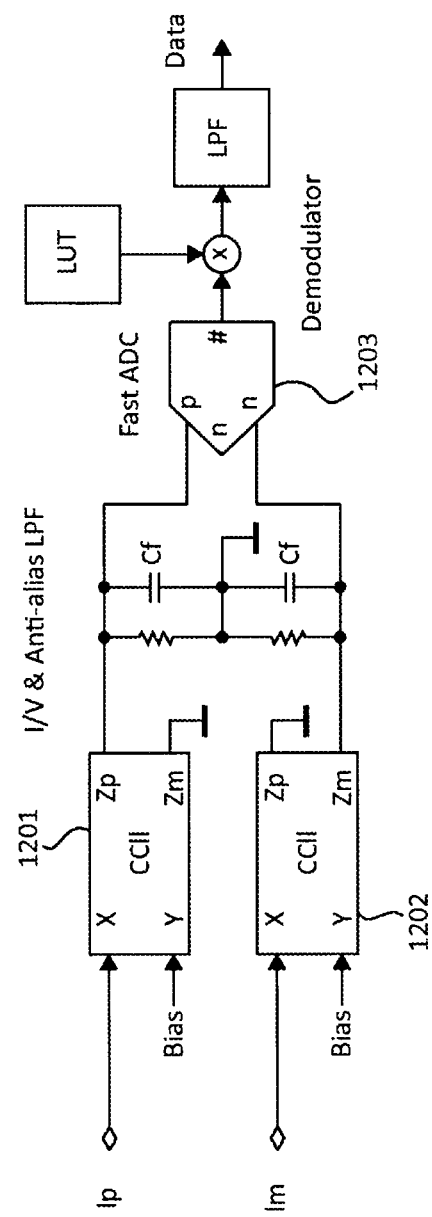
Figure 13:
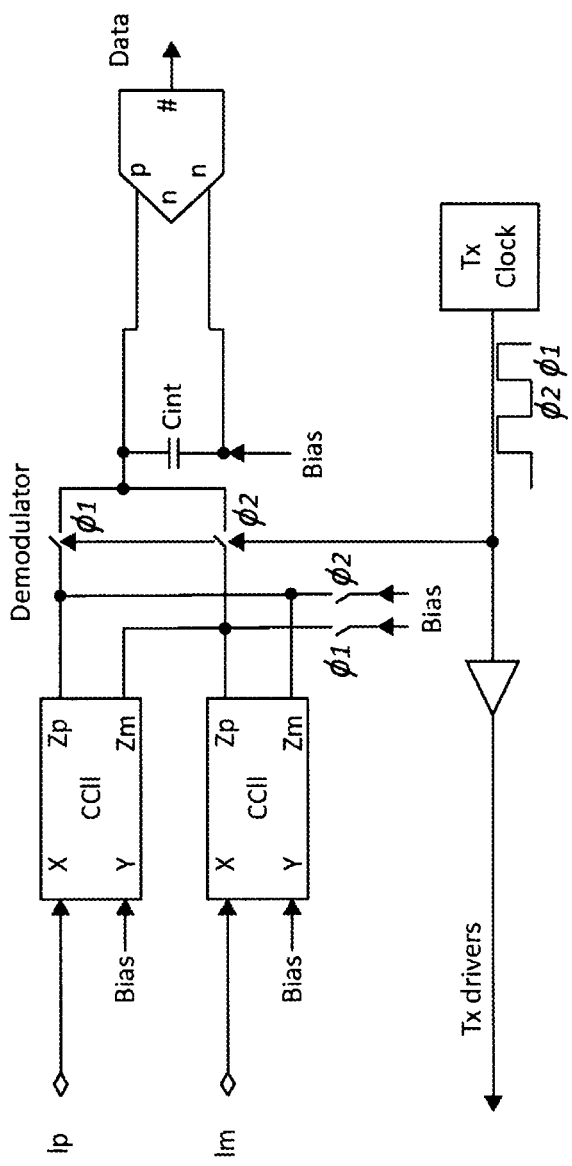

The low input impedance of terminal X allows building the current summation circuit. Referring to FIG. 12, two CCII 1201 and 1202 may be used as differential current summator front-end for a fast ADC 1203. As shown in FIG. 13, a differential current summator based on two CCII 1301 and 1302 may be used if measuring circuit is built using analog demodulator 1303 and analog integrator 1304. It may be necessary to take in account that multi-RX technique presupposes a RX lines multiplexer presence and each RX lines is possible to connect to the Ip and Im nodes.

Figure 14:
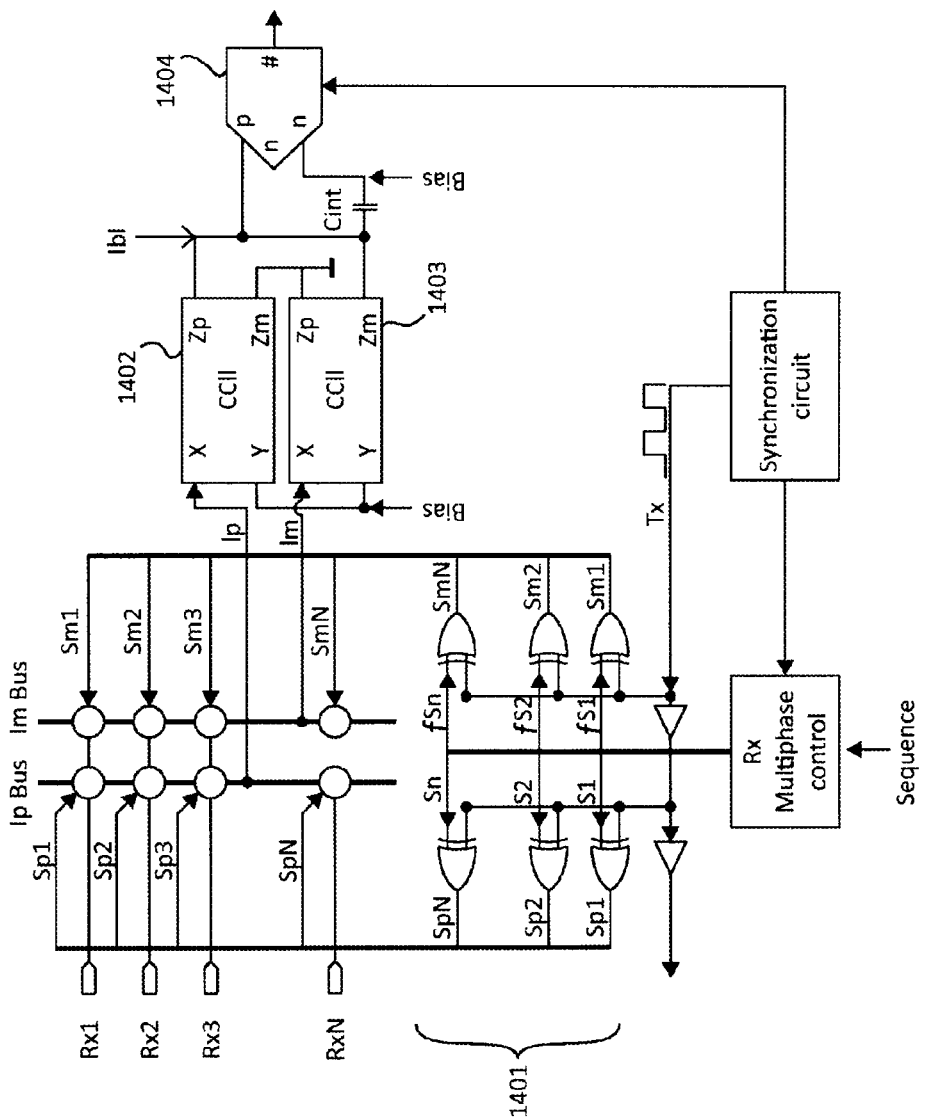

Referring to FIG. 14, so we afford to combine the multiplexing function with synchronous detection (demodulation) function. It is allows to remove any switching in integration capacitors chain. In the example shown in FIG. 14, input stage signal demodulation is combined with the multi-phase sequence switching. It is accomplished by combining demodulation signals with phase control signals using the XOR gates 1401 for the multiplexing signals generation. The differential current input receiver is formed by using two current conveyors 1402 and 1403, the positive and negative outputs of the current conveyors are joined together. The resulted current is integrated by $C_{INT}$ and resulted voltage signal is sampled by ADC 1404. The capacitor reset switches and baseline compensation switches are not shown.

The CCII based measuring channel has several advantages. First, it is possible to control the currents gain value. It is also possible to implement the LPF in the current mirrors circuit. The input terminal X is bidirectional and may be used as source for self capacitance measuring or for testing the RX chain integrity. Input noises, especially input spikes, can't directly penetrate in the next stages of measuring channel. The noises chain is locked via common and power source reel only. There are no feed-back loops in the signal transferring chain.

The CCII based measuring channel also has several disadvantages. First, it may be necessary to use additional components for currents mirrors. Current consumption also increases. The current mirrors must be trimmed well. Also, when the CCII is as an integrator, the leakage currents may lead to saturation issues.

Figure 15:
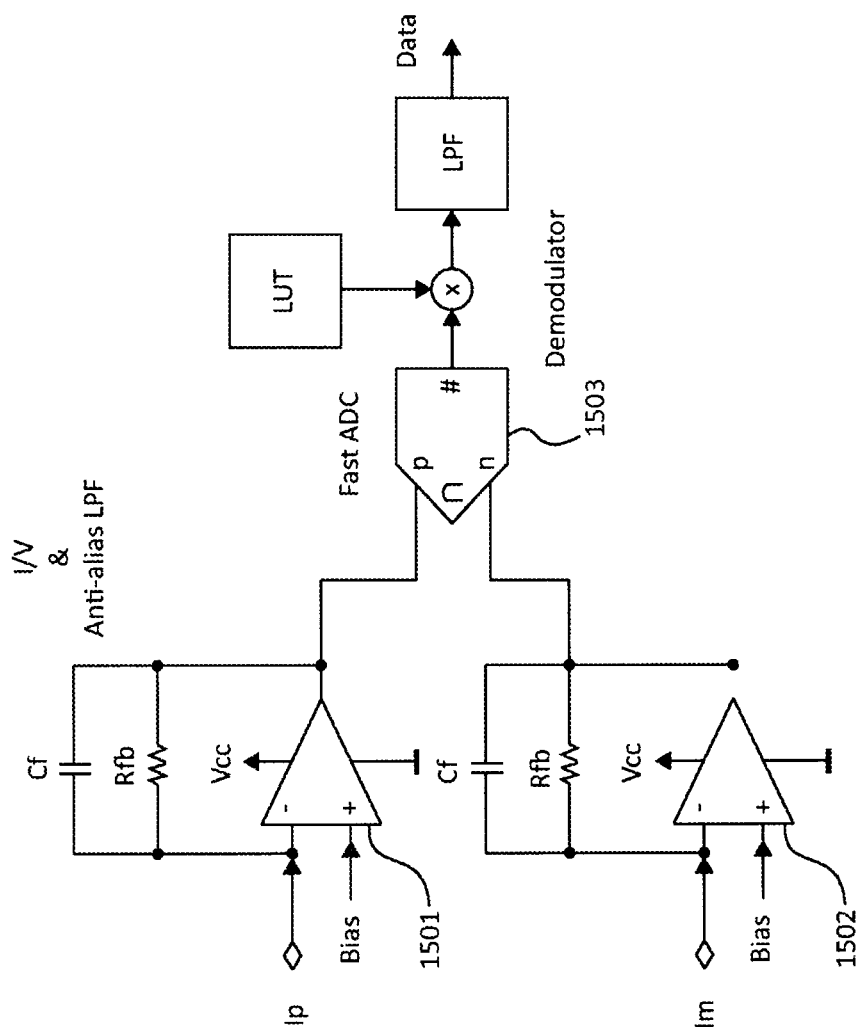

It is possible to transform the circuit in FIG. 12 using operational amplifiers in trans-impedance mode. An example of such is shown in FIG. 15, including operation amplifiers 1501 and 1502. A peculiarity of pseudo-differential structures is that they do not remove the common mode part of input signals at the input stage, and common mode signals are removed at subsequent stages (e.g. an ADC 1503). The pseudo-differential circuits form a pair of signals with a common mode part and gain for that signals component is same, resulting in the dynamic range reduction.

A peculiarity of capacitive sensors panels is small capacitance changes dependent of touch (less than 20% of the base mutual capacitance value). If we use parameters from the example described above than in the measuring channel is transferred near 1 pC of informative charge when the common mode charge is 105 pC and difference between charges transferred in node Ip and node Im is 35 pC during conversion cycle.

In this case, low sensitivity low sensitivity may be obtained when the amplifiers output voltage is limited by the ADC power sources voltage and the difference is a small part of ADC input voltage bend. Thereby a true differential trans-conductance amplifier may solve problem of large common mode signal without any additional compensation circuit.

Figure 16:
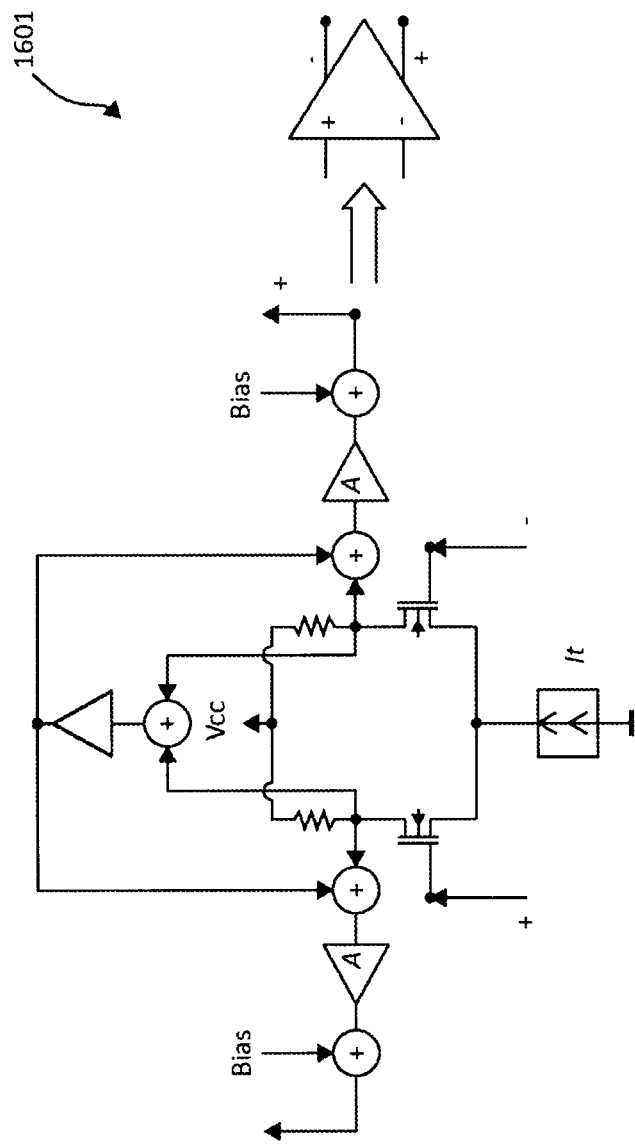
Figure 17:
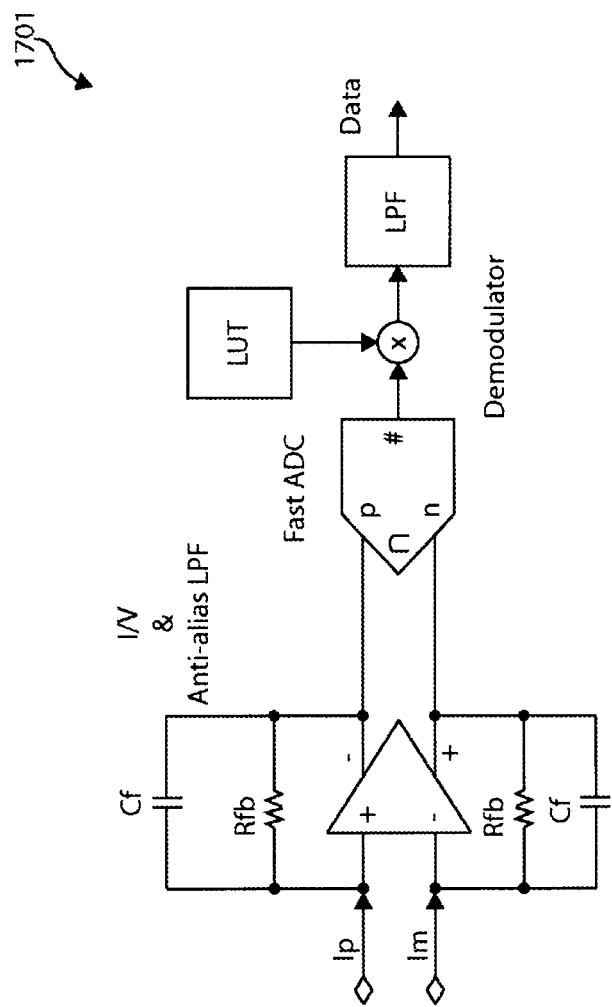

An example of a differential amplifier with an additional common mode suppression network 1601 is illustrated in FIG. 16, and a differential current summator 1701 based on this amplifier is shown in FIG. 17.

Trans-impedance based measuring channels have several advantages: it is possible to control the currents gain value; it is possible to implement the first order LPF (the filters order can increasing by inserting an additional filtering stage serially); there are no multiple current mirrors; it is possible to use the input nodes as bidirectional if ADC allows bias voltage change; and if the amplifiers frequency response is limited a high frequency, noises and spikes can penetrate in the ADC directly.

Figure 19:
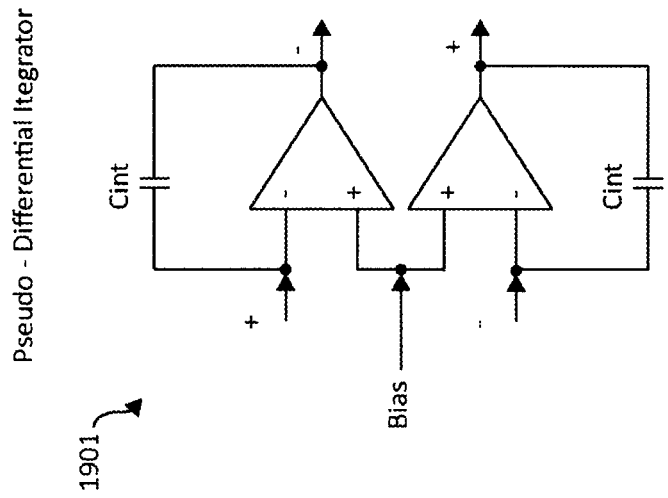
Figure 18:
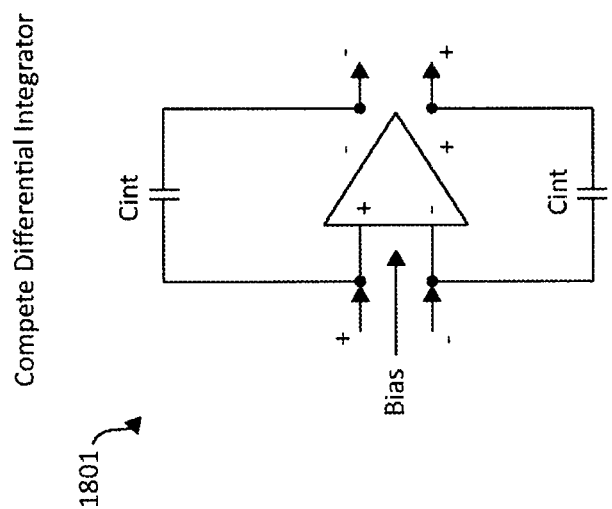

Another manner of transferred charge processing in analogue form is through charge accumulation using an active integrator. It is possible to build this integrator using differential 1801 or pseudo-differential 1901 amplifiers, examples of which are shown in FIGS. 18 and 19, respectively.

The switching capacitor circuits may be used to build the differential integrator with switches as synchronous detector and charge accumulator at same time. In this case, the differential integrator is used as current subtractor and additional switches are used for demodulating the inverse input node.

Figure 20:
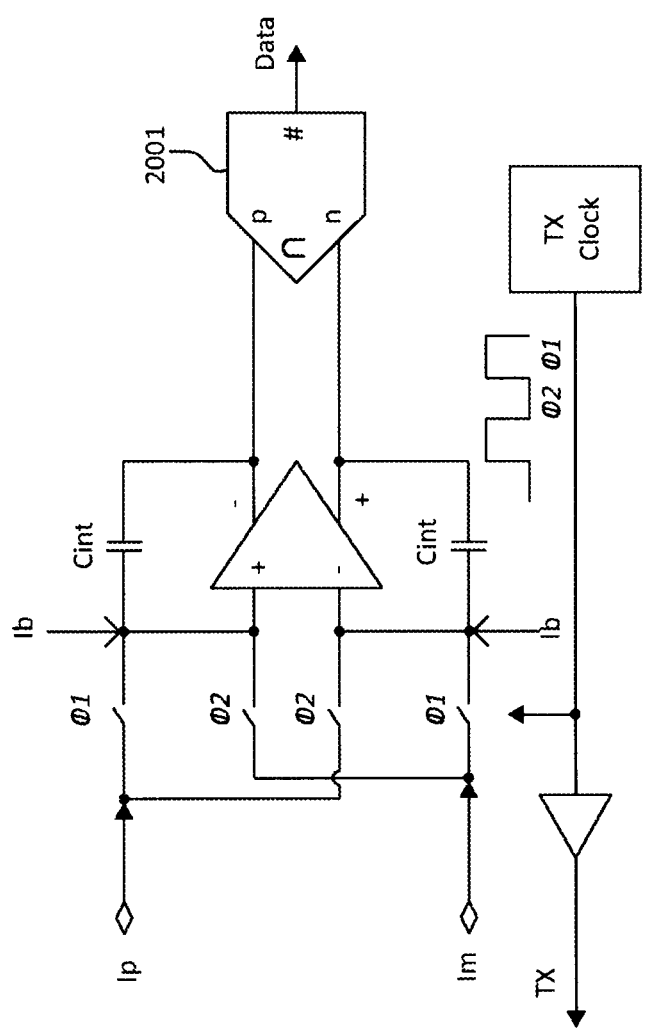

In the example shown in FIG. 20, the differential current receiver implementation is based on using a differential integrator. Demodulation switches are provided at the demodulator inputs. The result of integration is sampled by an ADC 2001. The bias, reset, and other supplementary circuits are not shown.

Figure 21:
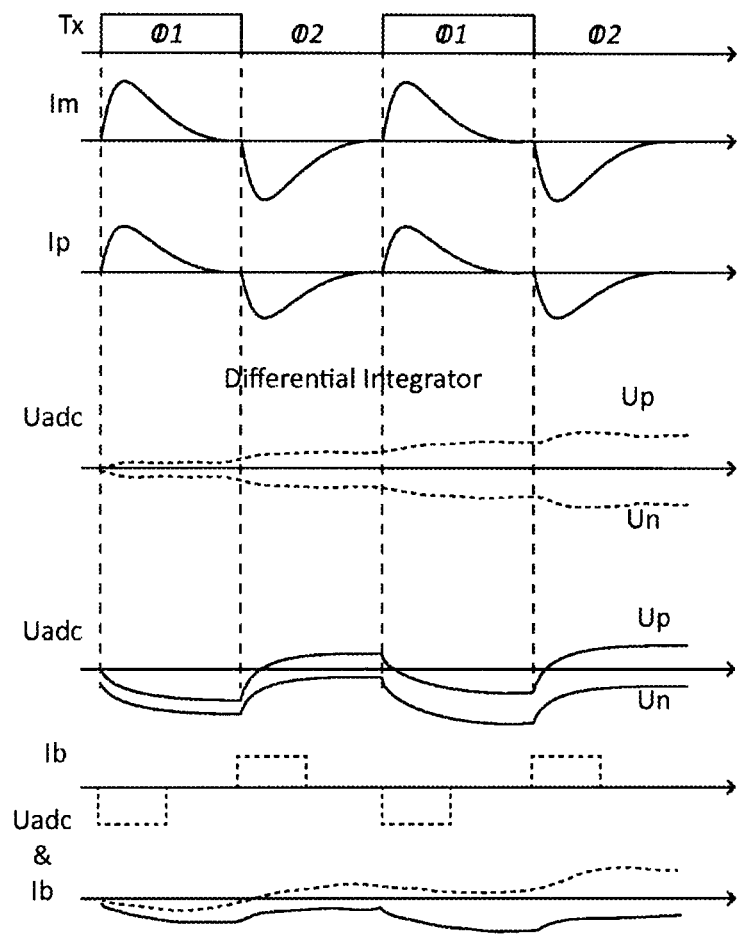
FIG. 21 is a temporal view of waveforms associated with the input stage illustrated in FIG. 16.

Transferred charge is accumulated in the integrators capacitors. At the end of charge accumulation procedure, voltage on the output of integrator is measured by ADC. FIG. 21 shows the control signal waveforms in this circuit. The line TX shows excitation signals waveform. This signal is transmitted to the sensing circuit and an output of that sensing circuit gives a reaction of sensing circuit as current pulses. Since the several Rx sensors lines at Ip and Im nodes are connected and quantity of the lines is different for this nodes, there is a different amplitude of current pulses in these nodes (see lines Ip and Im). The difference of Im and Ip currents charge integrators capacitors. The integrators output voltage converted in digital form with ADC at the end of integration procedure (after several TX cycles).

The difference between the integrators output voltage is dependent on the integrators implementation. If the integrator is based on the complete differential amplifier with front-end common mode suppression stage the common mode part of input signal is eliminated and its balanced output voltage grows proportionally to the input signals difference symmetrically around bias (the first Uadc line).

The pseudo-differential integrators output voltage contains the common mode signal at its balanced outputs. In results, the dynamic range of the pseudo differential integrator circuit is lower than the true differential integrator and the common mode signal could be in order larger than the informative signals. The common mode signal could be attenuated by using the hardware baseline compensation (subtraction) circuit.

Figure 22:
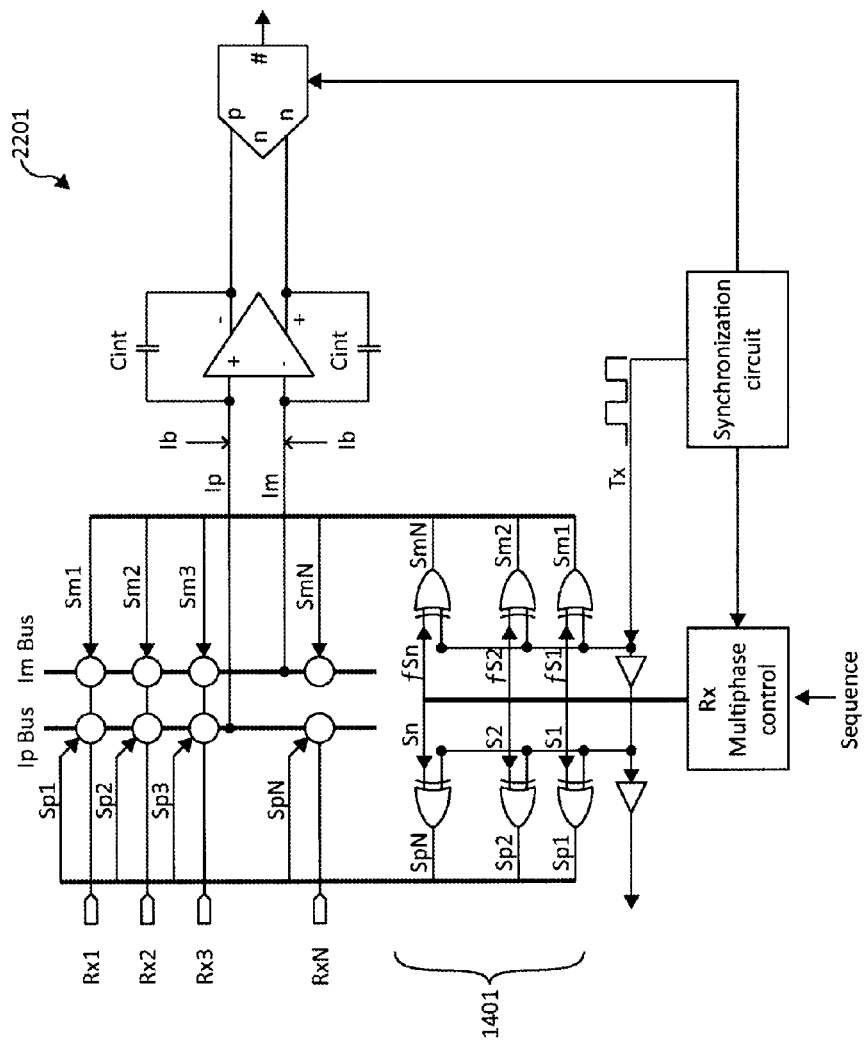
FIGS. 22-24 are block diagrams of embodiments of an input stage of a receiver for a capacitive sensor device.

FIG. 22 illustrates an embodiment in which the input multiplexer is used as a demodulator, as it is shown in FIG. 15.

A measuring channel based on direct charge accumulation has several advantages: it is possible to control the currents gain value by integrators capacitors value manipulation; it is possible to disconnect measuring channel from signals source while ADC converting accumulated charge (this minimizes noises penetrating from sensors into the ADC while conversion; the complete differential integrator suppresses the common mode signal well (this characteristic may help suppress external common mode noises in analog form before conversion). A measuring channel based on direct charge accumulation also has several advantages: the bidirectional function of integrator inputs is possible in the pseudo-differential integrator (may be bias voltage variation in complete differential integrator allows use inputs in bidirectional mode); capacitive feedback may require reset and limits integration time because leakage currents grow saturation possibilities; the pseudo-differential integrator may require additional elements for compensating the common mode signal; and the pseudo-differential integrator may require well trimmed integration capacitors.

Figure 23:
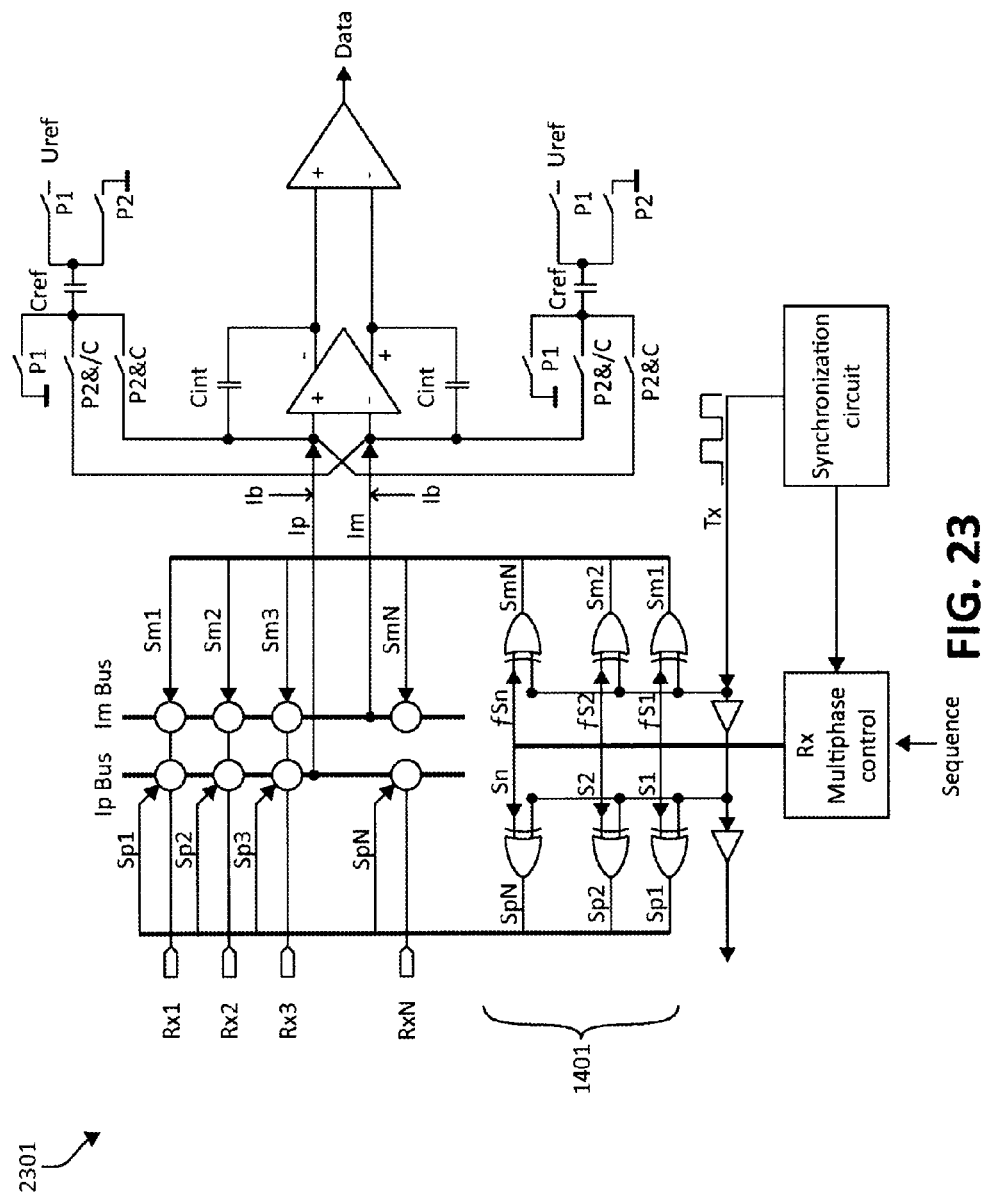

The circuit 2201 in FIG. 22 may be easily transformed into a circuit with charge balancing 2301, such as that shown in FIG. 23.

In general, the charge balancing circuits contain a lower resolution ADC, a lower resolution compensation DAC, and a digital filter, which generates the higher resolution output samples stream based on the lower resolution ADC conversion results. The comparator is example of the simplest 1 bit ADC. The fixed value ON/OFF current source is. However, the method (or algorithm) used to control the compensation chain may vary, as there are several methods that may be used. There are two general methods of charge compensation. A first example uses the discrete portion of charge, and a second example uses current flow while occur balance (for example, discharge charge accumulator while comparator fixes zero in charge accumulator). Both methods can convert transferred charge to digital code.

The compensation using discrete charge outputs a series of pulses, which has a count proportional to charge transferred from sensors during integration time. However, if a current flow is used for compensation, the time while compensation current is applied is proportional to the transferred charge.

The digital image of transferred charge can get by counting the number of periods of a reference frequency while compensation current flows.

Generally, the charge balancing circuit allows decrease integrator feedback capacitor value. However, in this case, the majority of charge transfer occurs at the beginning of the TX pulses and voltage in the integrators capacitor jumps very quickly. In order to increase resolution, a slow discharge procedure may be used. So the integrators voltage jump always will be presence and saturation of circuit will occur if integrators capacitor value will be too small.

Performance of this technique is similar to charge accumulation. However, overload possibilities with this method may be greater than when charge accumulation with multiple TX cycles is used.

Figure 24:
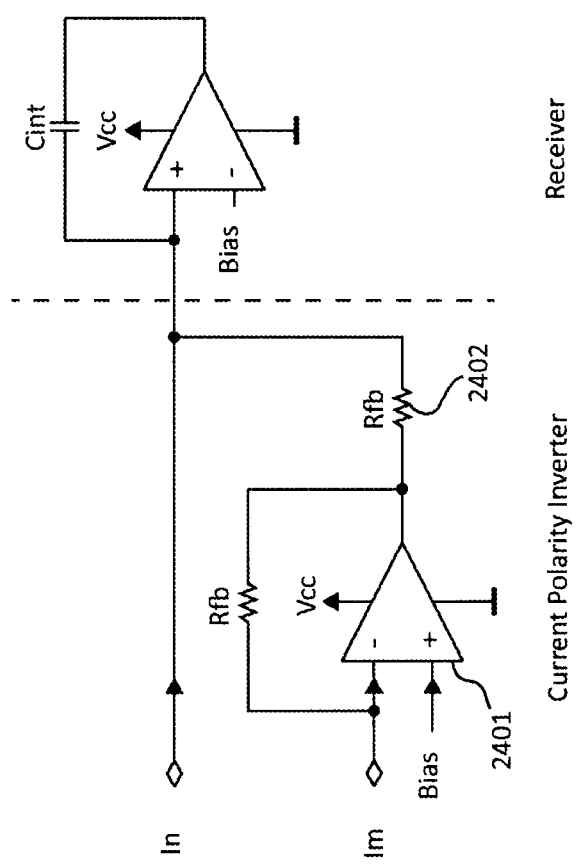

Referring now to FIG. 24, a simple circuit is shown which allows providing supporting the multi-RX technique if dedicated differential circuits are not available. In general, the input current polarity inversion is performed by using a current summing amplifier 2401 and transforming the resulted amplifier output voltage in current using resistor 2402.

Figure 25:
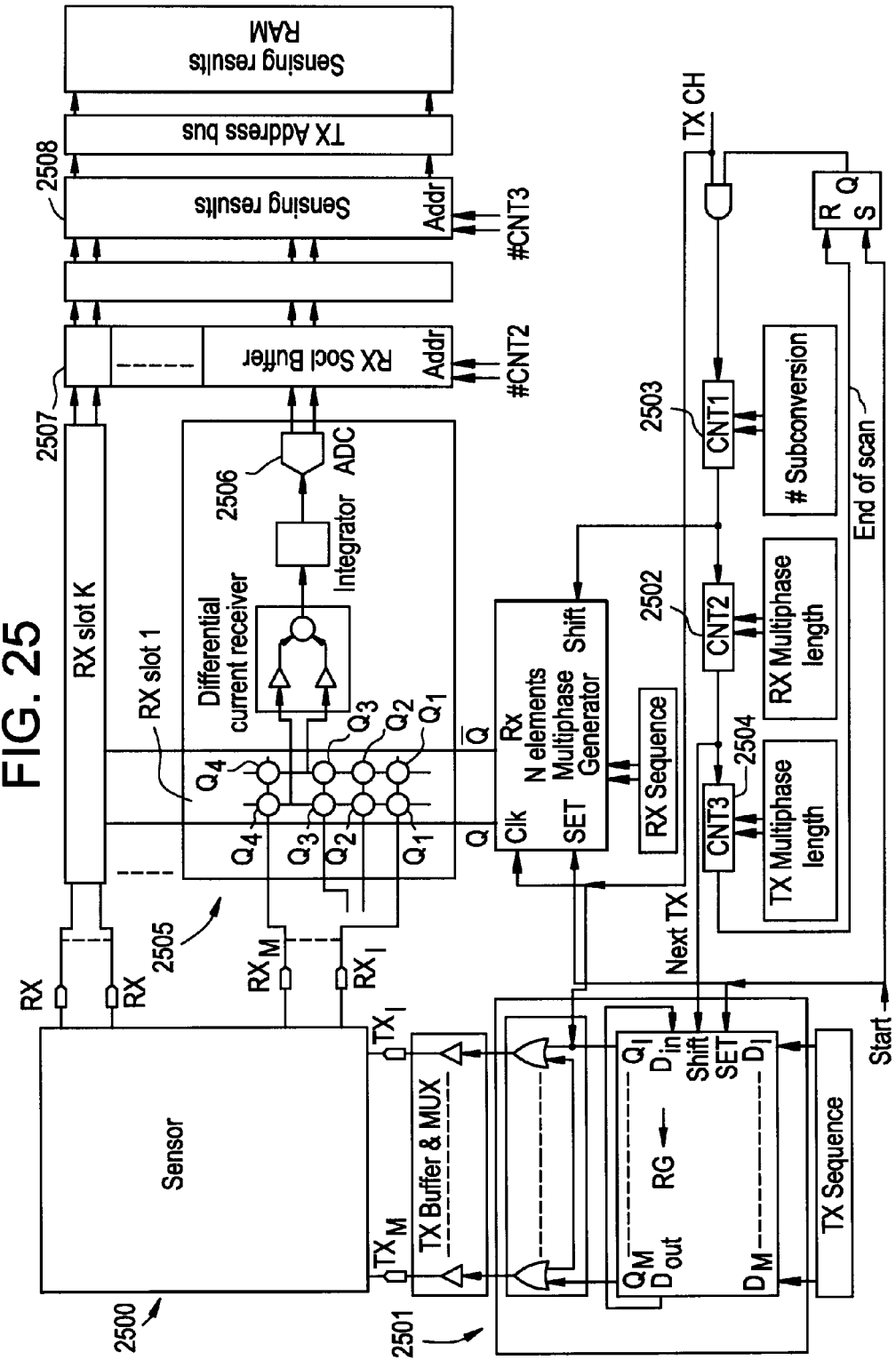
FIG. 25 is block diagram of a touch sensing device according to an embodiment.

The FIG. 25 shows touch sensing device 2500, which contains combined multi-RX and multi-TX systems. The multiphase TX signal 2501 generator contains array of the XOR gates for the TX signals phase setting, shift register for the multi-TX phase sequence rotation for the different scanning steps, sequencer, built around 3 counters. The first counter (CNT1) 2502 defines length of the each elementary subconversion. The second counter (CNT2) 2503 counts the number of the RX multi-phase scanning cycles. The third counter (CNT3) 2504 counts the number of the TX multi-phase cycles. The sensing channel 2505 is built around the differential current input receiver with input multiplexer combined with demodulator (combining circuits from FIG. 10 and FIG. 14). The demodulated signal is integrated and sampled by the ADC 2506. The results of the ADC conversions are stored in the RX slots buffer 2507. The RX deconvolution results are stored in the TX slots buffer 2508. RX and TX deconvolution operations may be provided "on-the-fly," or once the RX slot or TX slot buffers are full, depending on the implementation details.

Figure 26:
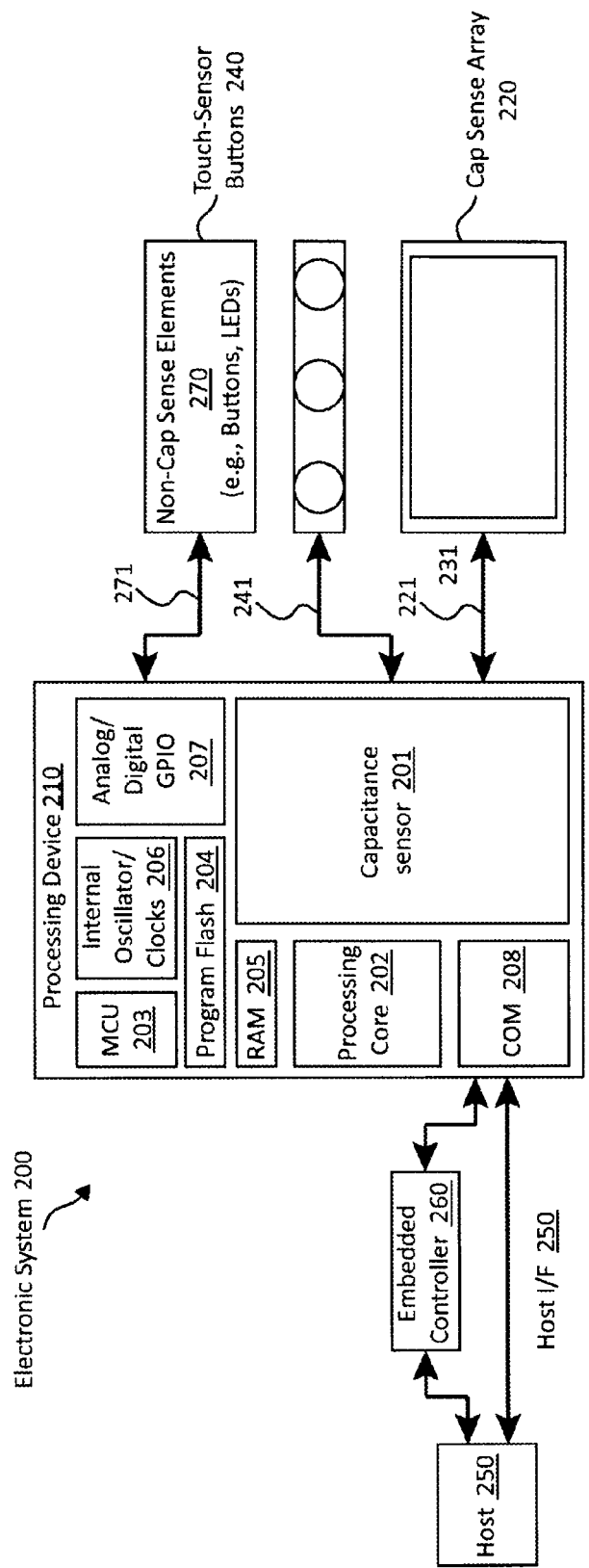
FIG. 26 is a block diagram illustrating an embodiment of an electronic system.

FIG. 26 is a block diagram illustrating one embodiment of an electronic system 200 having a processing device for detecting a presence of a conductive object (e.g., a finger) on a capacitive sense array according to embodiments of the present invention. The electronic system 200 includes a processing device 210, a capacitive sense array 220, touch-sense buttons 240, a host processor 250, an embedded controller 260 and non-capacitance sense elements 270. The capacitive sense array 220 may include any of the arrays 10 shown in FIGS. 1, 2, and 4 described above.

The processing device 210 may include analog and/or digital general-purpose input/output ("GPIO") ports 207. The GPIO ports 207 may be programmable and may be coupled to a Programmable Interconnect and Logic ("PIL"), which acts as an interconnect between GPIO ports 207 and a digital block array of the processing device 210 (not shown). The digital block array may be configured to implement a variety of digital logic circuits (e.g., DACs, digital filters, or digital control systems) using, in one embodiment, configurable user modules ("UMs"). The digital block array may be coupled to a system bus. The processing device 210 may also include memory, such as random access memory ("RAM") 205 and program flash 204. RAM 205 may be static RAM ("SRAM"), and program flash 204 may be a non-volatile storage, which may be used to store firmware (e.g., control algorithms executable by processing core 202 to implement operations described herein). The processing device 210 may also include a microcontroller unit ("MCU") 203 coupled to memory and the processing core 202.

The processing device 210 may also include an analog block array (not shown). The analog block array is also coupled to the system bus. The analog block array also may be configured to implement a variety of analog circuits (e.g., ADCs or analog filters) using, in one embodiment, configurable UMs. The analog block array may also be coupled to the GPIO ports 207.

As illustrated, a capacitance sensor 201 may be integrated into the processing device 210. The capacitance sensor 201 may include analog I/O pins for coupling to an external component, such as the capacitive sense array 220, the touch-sense buttons 240, and/or other devices. As described above, in accordance with one aspect of the embodiments described herein, the number of I/O pins on the capacitance sensor 201 may be minimized due to the capacitive sense array described above. The capacitance sensor 201 and the processing device 210 are described in more detail below.

The embodiments described herein may be used in any capacitive sense array application. For example, the capacitive sense array 220 may be a touch screen, a touch-sense slider or touch-sense buttons 240 (e.g., capacitance sense buttons). In one embodiment, these sense devices may include one or more capacitive sense elements. The operations described herein may include, but are not limited to, notebook pointer operations, lighting control (dimmer), volume control, graphic equalizer control, speed control, or other control operations requiring gradual or discrete adjustments. It should also be noted that these embodiments of capacitive sense implementations may be used in conjunction with non-capacitive sense elements 270, including but not limited to pick buttons, sliders (ex. display brightness and contrast), scroll-wheels, multi-media control (ex. volume, track advance, etc) handwriting recognition and numeric keypad operation.

In one embodiment, the capacitive sense array 220 is coupled to the processing device 210 via bus 221, which may include the receiver channels 14 shown in FIGS. 1, 2, and 4. The capacitive sense array 220 may include a one-dimensional sense array in one embodiment and a two-dimensional sense array in another embodiment. Alternatively, the capacitive sense array 220 may have more dimensions. Also, in one embodiment, the capacitive sense array 220 may be sliders, touchpads, touch screens or other sensing devices.

In another embodiment, the electronic system 200 includes touch-sense buttons 240 coupled to the processing device 210 via bus 241. The touch-sense buttons 240 may include a single-dimension or multi-dimension sense array. The single- or multi-dimension sense array may include multiple sense elements. For a touch-sense button, the sense elements may be coupled together to detect a presence of a conductive object over the entire surface of the sense device. Alternatively, the touch-sense buttons 240 may have a single sense element to detect the presence of the conductive object. In one embodiment, touch-sense buttons 240 may include a capacitive sense element. Capacitive sense elements may be used as non-contact sense elements. These sense elements, when protected by an insulating layer, offer resistance to severe environments.

The electronic system 200 may include any combination of one or more of the capacitive sense array 220 and/or touch-sense buttons 240. In another embodiment, the electronic system 200 may also include non-capacitance sense elements 270 coupled to the processing device 210 via bus 271. The non-capacitance sense elements 270 may include buttons, light emitting diodes ("LEDs") and other user interface devices, such as a mouse, a keyboard, or other functional keys that do not require capacitance sensing. In one embodiment, busses 271, 241, 231 and 221 may be a single bus. Alternatively, these buses may be configured into any combination of one or more separate buses.

The processing device 210 may include internal oscillator/clocks 206 and a communication block ("COM") 208. The oscillator/clocks block 206 provides clock signals to one or more of the components of processing device 210. The communication block 208 may be used to communicate with an external component, such as a host processor 250, via host interface ("I/F") line 251. Alternatively, the processing device 210 may also be coupled to the embedded controller 260 to communicate with the external components, such as host processor 250. In one embodiment, the processing device 210 is configured to communicate with the embedded controller 260 or the host processor 250 to send and/or receive data.

The processing device 210 may reside on a common carrier substrate such as, for example, an integrated circuit ("IC") die substrate, a multi-chip module substrate, or the like. Alternatively, the components of processing device 210 may be one or more separate integrated circuits and/or discrete components. In one exemplary embodiment, processing device 210 may be the Programmable System on a Chip ("PSoC®") processing device, developed by Cypress Semiconductor Corporation, San Jose, Calif. Alternatively, processing device 210 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sense device and sends the raw data to a host computer where it is analyzed by an application. In effect, the processing that is done by processing device 210 may also be done in the host.

It is noted that the processing device 210 of FIG. 21 may measure capacitance using various techniques, such as self capacitance sensing and mutual capacitance sensing. The self-capacitance sensing mode is also called single-electrode sensing mode, as each sensor element needs only one connection wire to the sensing circuit. For the self-capacitance sensing mode, touching the sensor element increases the sensor capacitance as added by the finger touch capacitance is added to the sensor capacitance. The mutual capacitance change is detected in the mutual capacitance-sensing mode. Each sensor element uses at least two electrodes: one is a transmitter (TX) electrode (also referred to herein as transmitter electrode) and the other is a receiver (RX) electrode. When a finger touches a sensor element or is in close proximity to the sensor element, the capacitive coupling between the receiver and the transmitter of the sensor element is decreased as the finger shunts part of the electric field to ground (e.g., chassis or earth).

The capacitance sensor 201 may be integrated into the IC of the processing device 210, or alternatively, in a separate IC. The capacitance sensor 201 may include relaxation oscillator (RO) circuitry, a sigma delta modulator (also referred to as CSD) circuitry, charge transfer circuitry, charge accumulation circuitry, or the like, for measuring capacitance as would be appreciated by one of ordinary skill in the art having the benefit of this disclosure. Alternatively, descriptions of the capacitance sensor 201 may be generated and compiled for incorporation into other integrated circuits. For example, behavioral level code describing capacitance sensor 201, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 201.

It should be noted that the components of the electronic system 200 may include all the components described above. Alternatively, the electronic system 200 may include only some of the components described above.

In one embodiment, the electronic system 200 is used in a notebook computer. Alternatively, the electronic device may be used in other applications, such as a mobile handset, a personal data assistant ("PDA"), a keyboard, a television, a remote control, a monitor, a handheld multi-media device, a handheld video player, a handheld gaming device, or a control panel.

As described herein, the multi-phase TX scanning methods may provide better noise immunity than the single TX scanning method. The embodiments above perform multi-phase TX scanning with circulant matrices. A circulant matrix is a special kind of matrices where each row vector is rotated one element (also referred to as an entry) to the right relative to the preceding row vector. Circulant matrices may have the following drawbacks: 1. Does not allow reach maximal possible noise reduction coefficient (Kns) of an excitation matrix; 2. Have complicated $M^{-1}$ elements; and 3. Relatively frequently maximal amount of single-phase elements in succession in one pattern is three or more that can result in integrator saturation.

The embodiments described herein perform multi-phase TX scanning with weighting matrices. An excitation matrix may be used to represent any sequence of drive signal waveforms. A weighting matrix is an excitation matrix that uses any combination or sequence of excitation of a signal, an inverse of the signal, or no signal at all. In one embodiment, a weighting matrix W is an n×n (0, 1, −1)-matrix such that $WW^T=wI$. The elements of the weighting matrix W can be a zero, one, or negative one. In another embodiment, the weighting matrix W is an n×m matrix, where n and m are different integers. For convenience, a weighting matrix of order n and weight w is often denoted by W(n,w). Weight w is minimal amount of nonzero elements in one row/column of the weighting matrix W. A W(n,n−1) is equivalent to a conference matrix and a W(n,n) is a Hadamard matrix. As described herein, other weighting matrices can also be used. Usage of such weighting matrices may provide improvements in at least the three characteristics of M(n,m) of circulant matrices. In particular, usage of such weighting matrices may allow an increase in noise reduction coefficients, may simplify $M^{-1}$ elements and may decrease input current of touches. Improved performance may be achieved by selecting the most appropriate weighting matrix, such as a Hadamard matrix, a conference matrix, or other weighting matrices, as well as pseudo-weighting matrices and extended weighting matrices described in more detail below.

Hereinafter the matrix M(n,m) is an excitation matrix, where n is the amount of TX electrodes and m is an amount of patterns. The pattern is a vector (1,n) which shows phases that applied simultaneously to the TX electrodes. Noise reduction coefficient (Kns) of excitation matrix is calculated as $$Kns = (n)^{1/2} \left( \sum_{i=1}^{n} \sum_{i=1}^{n} \sum_{j=1}^{m} bij^2 \right)^{1/2} \quad (32)$$

$$Kns = (n)^{\frac{1}{2}} \left( \sum_{i=1}^{n} \sum_{j=1}^{m} b_{ij}^2 \right)^{-\frac{1}{2}}$$

$$Kns = (n)^{\frac{1}{2}} \left( \sum_{i=1}^{n} \sum_{j=1}^{m} b_{ij}^2 \right)^{-\frac{1}{2}} \quad (1)$$

where $b_{ij}$-elements of inverse excitation matrix $M^{-1}$.

With regard to scanning capacitive touch panel, the current pattern of the TX signal that drives the TX electrodes can be in three states. The 1 and −1 states indicate the excitation of TX electrodes by a periodic signal (TX signal) with the same amplitude, frequency and form, but with the −1 state being phase shifted by 180°. The 0 state indicates that the amplitude of the TX signal is zero. Several excitation patterns are shown in FIG. 27.

Figure 27:
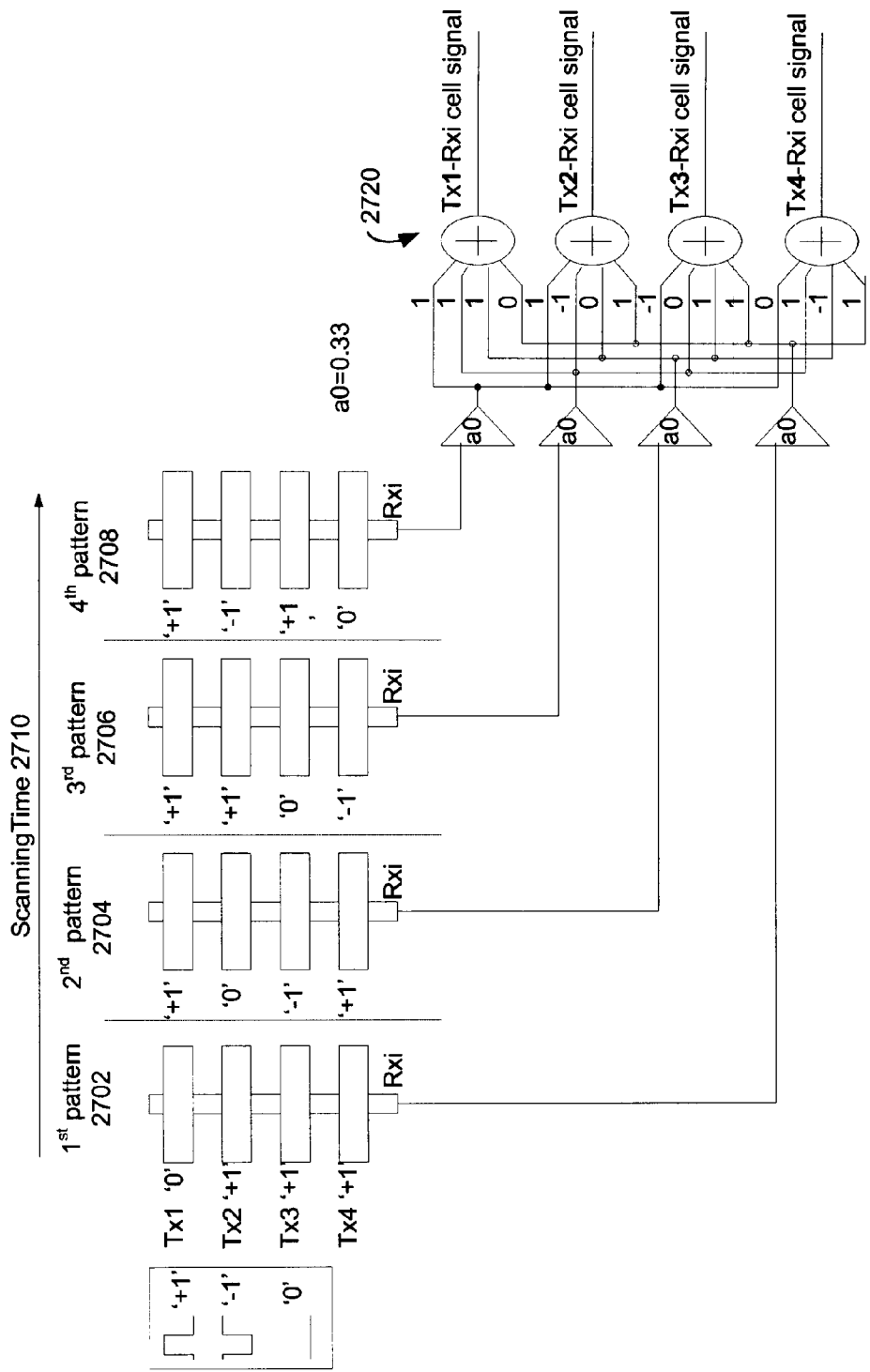
FIG. 27 illustrates four different excitation patterns according to one embodiment.

FIG. 27 illustrates four different excitation patterns according to one embodiment. The first excitation pattern 2702 is [0,+1,+1,+1], the second excitation pattern 2704 is [+1,0,− 1,+1], the third excitation pattern 2706 is [+1,+1,0, −1], and the fourth excitation pattern 2708 is [+1,−1,+1,0]. The signals from the RX line ($Rx_i$) during the scanning time 2710 are summed by summation circuits 2720. The summation circuits 2720. For one RX line, one signal is received from 4 TX lines during one time interval. During next time interval another signal is received from the same TX lines but with another configuration (pattern). Such event is repeated four times. After obtaining the four signals, the four signals are transferred to summation circuit 2720 which makes deconvolution. After summation circuit 2720, a capacitance map is obtained. The output of the first summation circuit 2720 represents the $Tx_1$-$Rx_i$ cell signal, the output of the second summation circuit 2720 represents the $Tx_2$-$Rx_i$ cell signal, the output of the third summation circuit 2720 represents the $Tx_3$-$Rx_i$ cell signal, and the output of the third summation circuit 2720 represents the $Tx_4$-$Rx_i$ cell signal.

A Hadamard matrix (H-matrix) is a square matrix whose elements are either +1 or −1 and whose rows are mutually orthogonal. A Hadamard matrix has maximal determinant and Kns among matrices with elements of absolute value less than or equal to 1 and so, is an external solution of Hadamard's maximal determinant problem. Kns for an n×n Hadamard matrix is equal to $\sqrt{n}$. An example of an H-matrix, as well as its corresponding transpose matrix, is shown below.

$$H(8,8) = \begin{bmatrix} 1 & 1 & 1 & 1 & 1 & 1 & 1 & 1 \\ 1 & -1 & 1 & -1 & 1 & -1 & 1 & -1 \\ -1 & -1 & 1 & 1 & -1 & -1 & 1 & 1 \\ -1 & 1 & 1 & -1 & -1 & 1 & 1 & -1 \\ -1 & -1 & -1 & -1 & 1 & 1 & 1 & 1 \\ -1 & 1 & -1 & 1 & 1 & -1 & 1 & -1 \\ -1 & -1 & 1 & 1 & 1 & 1 & -1 & -1 \\ -1 & 1 & 1 & -1 & 1 & -1 & -1 & 1 \end{bmatrix}$$

$$H(8,8)^{-1} = \begin{bmatrix} 0.125 & 0.125 & -0.125 & -0.125 & -0.125 & -0.125 & -0.125 & -0.125 \\ 0.125 & -0.125 & -0.125 & 0.125 & -0.125 & 0.125 & -0.125 & 0.125 \\ 0.125 & 0.125 & 0.125 & 0.125 & -0.125 & -0.125 & 0.125 & 0.125 \\ 0.125 & -0.125 & 0.125 & -0.125 & -0.125 & 0.125 & 0.125 & -0.125 \\ 0.125 & 0.125 & -0.125 & -0.125 & 0.125 & 0.125 & 0.125 & 0.125 \\ 0.125 & -0.125 & -0.125 & 0.125 & 0.125 & -0.125 & 0.125 & -0.125 \\ 0.125 & 0.125 & 0.125 & 0.125 & 0.125 & 0.125 & -0.125 & -0.125 \\ 0.125 & -0.125 & 0.125 & -0.125 & 0.125 & -0.125 & -0.125 & 0.125 \end{bmatrix}$$

The H-matrix above has an order of eight and a weight of eight. Alternatively, other orders and weights may be used.

A conference matrix (C-matrix) is a square matrix with 0 on the diagonal and +1 and −1 off the diagonal. Kns for an n×n conference matrix is equal to $\sqrt{n-1}^{\sqrt{n-1}}$. An example of a C-matrix, as well as its corresponding transpose matrix, is shown below.

$$C(8,7) = \begin{bmatrix} 0 & 1 & -1 & -1 & 1 & -1 & 1 & 1 \\ -1 & 0 & 1 & 1 & 1 & 1 & 1 & 1 \\ 1 & -1 & 0 & 1 & -1 & -1 & 1 & 1 \\ 1 & -1 & -1 & 0 & 1 & 1 & -1 & 1 \\ 1 & 1 & -1 & 1 & 0 & 1 & 1 & -1 \\ 1 & -1 & 1 & -1 & 1 & 0 & 1 & -1 \\ 1 & 1 & 1 & -1 & -1 & 1 & 0 & -1 \\ 1 & 1 & 1 & 1 & 1 & -1 & -1 & 0 \end{bmatrix}$$

$$C(8,7)^{-1} = \begin{bmatrix} 0 & -0.143 & 0.143 & 0.143 & 0.143 & 0.143 & 0.143 & 0.143 \\ 0.143 & 0 & -0.143 & -0.143 & 0.143 & -0.143 & 0.143 & 0.143 \\ -0.143 & 0.143 & 0 & -0.143 & -0.143 & 0.143 & 0.143 & 0.143 \\ -0.143 & 0.143 & 0.143 & 0 & 0.143 & -0.143 & -0.143 & 0.143 \\ 0.143 & 0.143 & -0.143 & 0.143 & 0 & 0.143 & -0.143 & 0.143 \\ -0.143 & 0.143 & -0.143 & 0.143 & 0.143 & 0 & 0.143 & -0.143 \\ 0.143 & 0.143 & 0.143 & -0.143 & 0.143 & 0.143 & 0 & -0.143 \\ 0.143 & 0.143 & 0.143 & 0.143 & -0.143 & -0.143 & 0.143 & 0 \end{bmatrix}$$

The C-matrix above has an order of eight and a weight of seven. Alternatively, other orders and weights may be used.

Also, other weighting matrices can be used. As can be seen, Kns for an n×n weighting matrix is equal to $\sqrt{w}^{\sqrt{w}}$. An example of another weighting matrix, as well as its corresponding transpose matrix, is shown below.

$$W(8,6) = \begin{bmatrix} -1 & -1 & 0 & -1 & 0 & -1 & 1 & -1 \\ 1 & 1 & 1 & 0 & 1 & 0 & 1 & -1 \\ 0 & -1 & 1 & 1 & -1 & 1 & 0 & -1 \\ -1 & 0 & 1 & 1 & 1 & -1 & -1 & 0 \\ 0 & -1 & 1 & -1 & 1 & 1 & 0 & 1 \\ -1 & 0 & -1 & 1 & 1 & 1 & 1 & 0 \\ 1 & -1 & 0 & 1 & 0 & -1 & 1 & 1 \\ 1 & -1 & -1 & 0 & 1 & 0 & -1 & -1 \end{bmatrix}$$

$$W(8,6)^{-1} = \begin{bmatrix} -0.167 & 0.167 & 0 & -0.167 & 0 & -0.167 & 0.167 & 0.167 \\ -0.167 & 0.167 & -0.167 & 0 & -0.167 & 0 & -0.167 & -0.167 \\ 0 & 0.167 & 0.167 & 0.167 & 0.167 & -0.167 & 0 & -0.167 \\ -0.167 & 0 & 0.167 & 0.167 & -0.167 & 0.167 & 0.167 & 0 \\ 0 & 0.167 & -0.167 & 0.167 & 0.167 & 0.167 & 0 & 0.167 \\ -0.167 & 0 & 0.167 & -0.167 & 0.167 & 0.167 & -0.167 & 0 \\ 0.167 & 0.167 & 0 & -0.167 & 0 & 0.167 & 0.167 & -0.167 \\ -0.167 & -0.167 & -0.167 & 0 & 0.167 & 0 & 0.167 & -0.167 \end{bmatrix}$$

It should be noted that the order of the H-matrices needs to be a 1, 2 or a multiple of 4. The order of the C-matrices also does not exist for odd n values and for some even n values. In some embodiments, a pseudo-weighting matrix can be used as described below. In particular, the pseudo-weighting matrix can have orders with odd n values. For example, when scanning a panel with seven electrodes (n=7) to receive Kns= $\sqrt{7}^{\sqrt{7}}$, an H-matrix with n=7 does not exist as seven is not multiple of 4. In this case, a pseudo-weighting matrix can be used.

A pseudo-weighting matrix (pW) is an n×m (m>n) (0, 1, −1)-matrix such that $pWpW^T = wI$. Here, w is the weight of initial W matrix. Below is an example of pseudo-weighting matrix with n=7, and its corresponding transpose matrix.

$$pW(7,8) = \begin{bmatrix} 1 & 1 & 1 & 1 & 1 & 1 & 1 & 1 \\ 1 & -1 & 1 & -1 & 1 & -1 & 1 & -1 \\ -1 & -1 & 1 & 1 & -1 & -1 & 1 & 1 \\ -1 & 1 & 1 & -1 & -1 & 1 & 1 & -1 \\ -1 & -1 & -1 & -1 & 1 & 1 & 1 & 1 \\ -1 & 1 & -1 & 1 & 1 & -1 & 1 & -1 \\ -1 & -1 & 1 & 1 & 1 & 1 & -1 & -1 \end{bmatrix}$$

$$pW(7,8)^{-1} = \begin{bmatrix} 0.125 & 0.125 & -0.125 & -0.125 & -0.125 & -0.125 & -0.125 \\ 0.125 & -0.125 & -0.125 & 0.125 & -0.125 & 0.125 & -0.125 \\ 0.125 & 0.125 & 0.125 & 0.125 & -0.125 & -0.125 & 0.125 \\ 0.125 & -0.125 & 0.125 & -0.125 & -0.125 & 0.125 & 0.125 \\ 0.125 & 0.125 & -0.125 & -0.125 & 0.125 & 0.125 & 0.125 \\ 0.125 & -0.125 & -0.125 & 0.125 & 0.125 & -0.125 & 0.125 \\ 0.125 & 0.125 & 0.125 & 0.125 & 0.125 & 0.125 & -0.125 \\ 0.125 & -0.125 & 0.125 & -0.125 & 0.125 & -0.125 & -0.125 \end{bmatrix}$$

The pseudo-weighting (pW) matrix may be derived from any W matrix by deleting some amount of rows/columns and the transpose matrix can be derived from the pW matrix through a pseudo-inverse function. A computationally simple and accurate way to compute the pseudo-inverse may be done by using the singular value decomposition.

Equation (32) is applicable for Kns calculation of pseudo-weighting (pW) matrix. But more convenient for description of pW noise suppression properties can be expressed in the following equations:

$$Knorm = \frac{Kns}{Kav} = n\left(m\sum_{i=1}^{n}\sum_{j=1}^{m} b_{ij}\right)^{-\frac{1}{2}} \quad (33)$$

$$Knorm = \frac{Kns}{Kav} = n\left(m\sum_{i=1}^{n}\sum_{j=1}^{m} b_{ij}\right)^{-\frac{1}{2}} \quad (33)$$

$$Knorm = \frac{Kns}{Kav} = n\left(m\sum_{i=1}^{n}\sum_{j=1}^{m} b_{ij}\right)^{-\frac{1}{2}}$$

$$Kav = \sqrt{\frac{m}{n}}, \quad (34)$$

where Kav is noise suppression coefficient received by averaging of m/n samples (m>n) and Knorm is the gain of multi-phase TX scanning (Kns) over averaging (Kav). Kns grows when m increases, so Knorm better represents suppression properties of the multi-phase TX. It should be noted that in tables 4 and 5 only Knorm is used. The pseudo-weighting (pW) matrix technique allows the Knorm to be around $\sqrt{w^{\sqrt{w}}}$.

The excitation matrix may also be an extended weighting matrix. An extended weighting matrix (eW) is an n×$m_e$ ($m_e$>n) (0, 1, −1)-matrix such that Knorm(pW(n,m,w))<Knorm(eW(n,$m_e$,w))<$\sqrt{w}$, w≠n, $m_e$>m, wherein m is the amount of columns/time patterns in weighing matrices, and $m_e$ is amount of columns/time patterns extended weighting matrix. It should be noted that extended weighting matrix have noise reduction coefficient that is larger than pseudo-weighing matrices but smaller than Hadamard matrices ($\sqrt{w}$). Also, extended weighting matrices are longer than pseudo-weighing matrices. It is possible to find eW matrix with Knorm bigger than pW, but at the expense of bigger amount of patterns. It should be noted that the extended weighting matrices may not have simple $eW^{-1}$ coefficients and may influence pipeline filtering. $m_e$ growth entails filtering array decline which by-turn entails to lower filter effectiveness. This effect also slightly shows up in pW matrices. Also, the eW matrices may use more resources, such as random access memory (RAM).

Tables 4 and 5 show comparison of some W and pW matrices properties with properties of optimal circulant matrices described above. Here, Knormw—Knorm for W and pW matrices. Knormc—Knorm for circulant matrices, Kimp—Knorm improvement in usage of W and pW matrices over circulant in percentages, Sspw—maximal amount of single—phase elements in one pattern for W and pW matrices and Sspc—for circulant, Simp—Ssp improvement in usage of W and pW matrices over circulant in percent.

TABLE 4

W, pW and circulant (minimal Sspc) matrices properties

| n | 5 | 6 | 7 | 8 | 9 | 10 | 11 | 12 |
|---|---|---|---|---|---|----|----|----|
| Knormw | 1.83 | 2.24 | 2.29 | 2.45 | 3.00 | 3.00 | 2.87 | 3.16 |
| Knormc | 1.41 | 2.14 | 2.00 | 2.45 | 2.05 | 2.44 | 2.45 | 2.98 |
| Kimp, % | 29.10 | 4.58 | 14.56 | 0.00 | 46.00 | 22.82 | 17.26 | 6.07 |
| Sspw | 3 | 4 | 4 | 5 | 6 | 6 | 6 | 7 |
| Sspc | 3 | 4 | 4 | 5 | 5 | 6 | 6 | 1 |
| Simp, % | 0 | 0 | 0 | 0 | −16.67 | 0 | 0 | 0 |

TABLE 5

W, pW and circulant (minimal Sspc + 1) matrices properties

| n | 5 | 6 | 7 | 8 | 9 | 10 | 11 | 12 |
|---|---|---|---|---|---|----|----|----|
| Knormw | 2.24 | 2.45 | 2.47 | 2.83 | 3.00 | 3.16 | 3.18 | 3.46 |
| Knormc | 2.12 | 2.14 | 1.50 | N/A | 2.25 | 2.44 | 2.92 | 3.27 |
| Kimp, % | 5.43 | 14.57 | 64.99 | N/A | 33.33 | 29.44 | 8.78 | 6.07 |
| Sspw | 4 | 5 | 5 | 6 | 6 | 7 | 7 | 8 |
| Sspc | 4 | 5 | 5 | N/A | 6 | 7 | 7 | 8 |
| Simp, % | 0 | 0 | 0 | N/A | 0 | 0 | 0 | 0 |

Besides Knorm/Ssp improvement, W and pW matrices have simple $W^{-1}$ and $pW^{-1}$ coefficients and lower energy density (due to presence of zeros) which will reduce integrator saturation effect.

Figure 28:
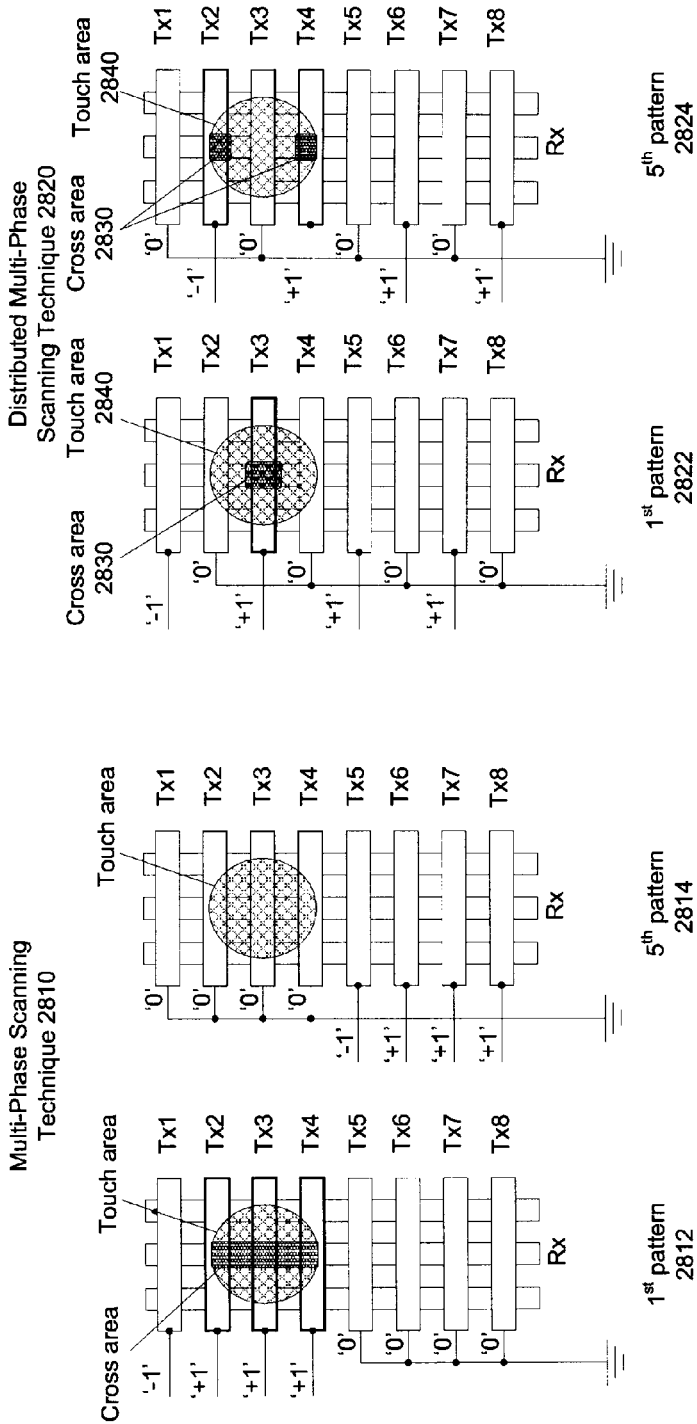
FIG. 28 illustrates two scanning patterns of a multi-phase scanning technique and a distributed multi-phase scanning technique according to one embodiment.

In one embodiment, if the number of TX electrodes of the capacitive touch screen panel is much bigger than the dimension n of the matrix used M (n, m), then the TX electrodes can be distributed so that the distance between TX electrodes is a maximum distance. This will reduce the change of input current of one Rx channel resulting from touching a panel. An example of such a distribution is shown in FIG. 28. The example uses the panel with eight TX electrodes and multi-phase TX signals are applied to the four TX electrodes.

FIG. 28 illustrates two scanning patterns of a multi-phase scanning technique 2810 and a distributed multi-phase scanning technique 2820 according to one embodiment. The following description compares a normal excitation matrix and a distributed excitation matrix according to one embodiment. These matrices are expressed mathematically as follows.

Current multi-phase scanning matrix looks like M1:

$$M1(8,8) = \begin{bmatrix} 1 & 1 & 1 & -1 & 0 & 0 & 0 & 0 \\ 1 & 1 & -1 & 1 & 0 & 0 & 0 & 0 \\ 1 & -1 & 1 & 1 & 0 & 0 & 0 & 0 \\ -1 & 1 & 1 & 1 & 0 & 0 & 0 & 0 \\ 0 & 0 & 0 & 0 & 1 & 1 & 1 & -1 \\ 0 & 0 & 0 & 0 & 1 & 1 & -1 & 1 \\ 0 & 0 & 0 & 0 & 1 & -1 & 1 & 1 \\ 0 & 0 & 0 & 0 & -1 & 1 & 1 & 1 \end{bmatrix}$$

The distributed multi-phase scanning matrix looks like pM1:

$$pM1(8,8) = \begin{bmatrix} 1 & 1 & 1 & -1 & 0 & 0 & 0 & 0 \\ 0 & 0 & 0 & 0 & 1 & 1 & 1 & -1 \\ 1 & 1 & -1 & 1 & 0 & 0 & 0 & 0 \\ 0 & 0 & 0 & 0 & 1 & 1 & -1 & 1 \\ 1 & -1 & 1 & 1 & 0 & 0 & 0 & 0 \\ 0 & 0 & 0 & 0 & 1 & -1 & 1 & 1 \\ -1 & 1 & 1 & 1 & 0 & 0 & 0 & 0 \\ 0 & 0 & 0 & 0 & -1 & 1 & 1 & 1 \end{bmatrix}$$

As shown in FIG. 28, the multi-phase scanning technique 2810 includes multiple patterns, including a first pattern 2812 and a fifth pattern 2814 as shown. The first pattern 2812 is [−1,+1,+1,+1,0,0,0,0] to be applied to the TX electrodes Tx1-Tx8 and the fifth pattern 2814 is [0,0,0,0,−1,+1,+1,+1] to be applied to the TX electrodes Tx1-Tx8. Also, as shown in FIG. 28, the distributed multi-phase scanning technique 2820 includes multiple patterns, including a first pattern 2822 and a fifth pattern 2824 as shown. The first pattern 2822 is [−1,0,+1,0,+1,0,+1,0] to be applied to the TX electrodes Tx1-Tx8 and the fifth pattern 2824 is [0,−1,0,+1,0,+1,0,−1] to be applied to the TX electrodes Tx1-Tx8. It should be noted that the scanning time and the coefficient of noise in both techniques are identical. However, the cross areas 2830 between the touch areas 2840 and TxRx cross sections are more constant in the distributed technique 2820 than in the other technique 2810.

Figure 29:
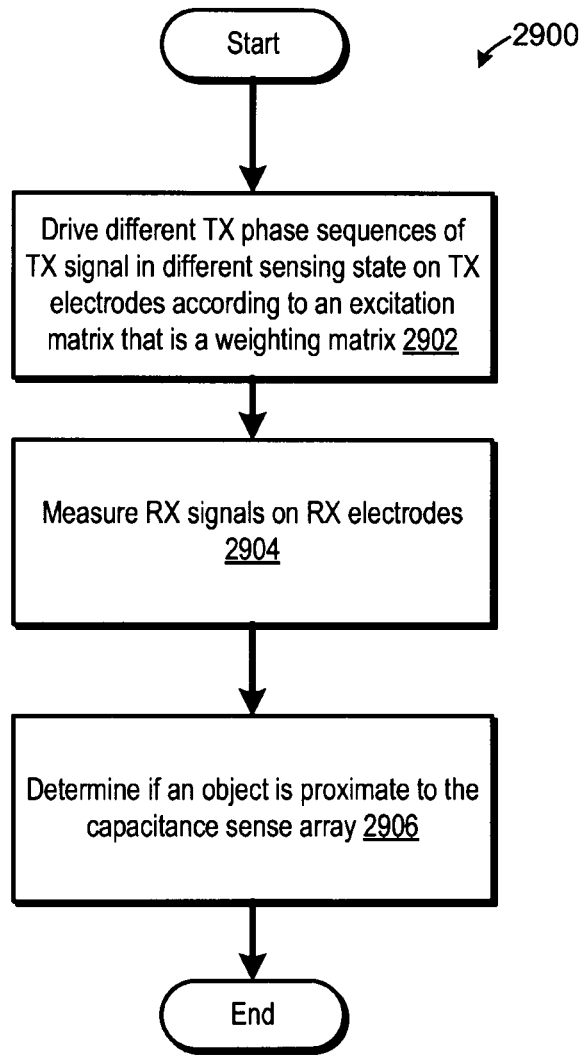
FIG. 29 is a flow chart illustrating a method of noise suppression according to one embodiment.

FIG. 29 is a flow chart illustrating a method 2900 of noise suppression according to one embodiment. The method 2900 may be performed by processing logic that may comprise hardware (circuitry, dedicated logic, etc.), software (such as is run on a general purpose computing system or a dedicated machine), firmware (embedded software), or any combination thereof. In one embodiment, the controller 260 performs some of operations of method 2900. Alternatively, other components of the capacitance sensing systems can perform some or all of the operations of method 2900.

Referring to FIG. 29, the method 2900 begins with driving different TX) phase sequences of a TX signal in different sensing stages on the TX electrodes of a capacitance sense array (block 2902). The different TX phase sequences are defined by an excitation matrix, the excitation matrix being a weighting matrix. The weighting matrix may be a H-matrix, a C-matrix, other weighting matrices, a pseudo-weighting matrix, an extended weighting matrix or a distributed weighting matrix, as described herein. The processing logic measures the RX signals on the RX electrodes (block 2904). The processing logic determines if an object is proximate to the capacitance sense array 2906 using the RX signals (block 2906), and the method 2900 ends.

In further embodiments, the weighting matrix (W) is an n×n matrix with each element of the weighting matrix being at least one of −1, +1, or 0 such as that $WW^T = wI$ where w represents a weight of the weighting matrix and is a minimal amount of non-zero elements in one row or column of the weighting matrix. In another embodiment, the weighting matrix is an n×m matrix with each element of the weighting matrix being at least one of −1, +1, or 0, and n and m are different integer values. In one embodiment, the weighting matrix (W) is denoted by a W(n,w), where n is the order and w is the weight of the weighting matrix. This weighting matrix is a conference matrix and is denoted as W(n,n−1). The conference matrix (C-matrix) has elements that are zero on a diagonal and either +1 or −1 off of the diagonal. One example of C(8,7) conference matrix is described above. In another embodiment, the weighting matrix W has an order n and w is the weight of the weighting matrix. This weighting matrix is a Hadamard matrix and is denoted as W(n,n). The Hadamard matrix (H-matrix) may be a square matrix whose elements are either +1 or −1 and whose rows are mutually orthogonal. One example of H(8,8) Hadamard matrix is described above.

In another embodiment, each of the elements of the weighting matrix is in at least one of three states, a one state, a negative one state or a zero state. The one state and negative one state indicate an excitation of the TX electrodes by the TX signal with the same amplitude, frequency and form, but with a phase shifted by 180° for the negative one state. The zero state indicates that the amplitude of the TX signal is zero.

Alternatively, other weighting matrices with other weights and orders may be used as described above, such as the example W(8,6) matrix.

In other embodiments, the weighting matrix is a pseudo-weighting (pW) matrix including n×m elements, where n is greater than m. For example, the pW(7,8) matrix described above is an example of a pW matrix. In other embodiments, the weighting matrix is an extended weighting matrix including n×m elements, where m is greater than n. Alternatively, distributed weighting matrixes can be used to drive a smaller number of TX electrodes, such as described with respect to the pM1(8,8) matrix.

Although the foregoing examples have been described in some detail for purposes of clarity of understanding, the invention is not limited to the details provided. There are many alternative ways of implementing the invention. The disclosed examples are illustrative and not restrictive.

Embodiments of the present invention, described herein, include various operations. These operations may be performed by hardware components, software, firmware or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
driving concurrently a plurality of transmit (TX) signals in different sensing stages on a plurality of TX electrodes of a capacitance sense array, wherein each transmit (TX) signal has a different transmit phase and the different transmit TX phases are defined by an excitation matrix, wherein the excitation matrix is a weighting matrix and wherein the excitation matrix is a square matrix defined by the number of TX electrodes in the plurality of TX electrodes; measuring receive (RX) signals on a plurality of RX electrodes of the capacitance sense array; and determining if an object is proximate to the capacitance sense array based on the measured RX signals.

2. The method of claim 1, wherein the weighting matrix (W) is an n×n matrix with each element of the weighting matrix being at least one of −1, +1, or 0.

3. The method of claim 2, wherein the weighting matrix (W) is denoted by a W(n,w), where n is the order and w is the weight of the weighting matrix, and wherein the weighting matrix is a conference matrix, and wherein the conference matrix is denoted as W(n,n−1).

4. The method of claim 2, wherein the weighting matrix (W) is denoted by a W(n,w), where n is the order and w is the weight of the weighting matrix, and wherein the weighting matrix is a Hadamard matrix, and wherein the Hadamard matrix is denoted as W(n,n).

5. The method of claim 1, wherein the pseudo-weighting matrix (pW) is an n×m matrix with each element of the weighting matrix being at least one of −1, +1, or 0, wherein n and m are different integer values.

6. The method of claim 1, wherein each element of the weighting matrix comprises at least one of three states, a one state, a negative one state, or a zero state, wherein the one state and negative one state indicate an excitation of the TX electrodes by the TX signal with the same amplitude, frequency, and form, but with a phase shifted by 180° for the negative one state, and wherein the zero state indicates that the amplitude of the TX signal is zero.

7. The method of claim 1, wherein the weighting matrix is a Hadamard matrix (H-matrix) that is a square matrix whose elements are either +1 or −1 and whose rows are mutually orthogonal $$H(8,8) = \begin{bmatrix} 1 & 1 & 1 & 1 & 1 & 1 & 1 & 1 \\ 1 & -1 & 1 & -1 & 1 & -1 & 1 & -1 \\ -1 & -1 & 1 & 1 & -1 & -1 & 1 & 1 \\ -1 & 1 & 1 & -1 & -1 & 1 & 1 & -1 \\ -1 & -1 & -1 & -1 & 1 & 1 & 1 & 1 \\ -1 & 1 & -1 & 1 & 1 & -1 & 1 & -1 \\ -1 & -1 & 1 & 1 & 1 & 1 & -1 & -1 \\ -1 & 1 & 1 & -1 & 1 & -1 & -1 & 1 \end{bmatrix}.$$

8. The method of claim 1, wherein the weighting matrix is a conference matrix (C-matrix) whose elements are zero on a diagonal and either +1 or −1 off of the diagonal.

9. The method of claim 8, wherein the C-matrix comprise an order of eight and a weight of seven as represented below:

$$C(8,7) = \begin{bmatrix} 0 & 1 & -1 & -1 & 1 & -1 & 1 & 1 \\ -1 & 0 & 1 & 1 & 1 & 1 & 1 & 1 \\ 1 & -1 & 0 & 1 & -1 & -1 & 1 & 1 \\ 1 & -1 & -1 & 0 & 1 & 1 & -1 & 1 \\ 1 & 1 & -1 & 1 & 0 & 1 & 1 & -1 \\ 1 & -1 & 1 & -1 & 1 & 0 & 1 & -1 \\ 1 & 1 & 1 & -1 & -1 & 1 & 0 & -1 \\ 1 & 1 & 1 & 1 & 1 & -1 & -1 & 0 \end{bmatrix}.$$

10. The method of claim 1, wherein the weighting matrix comprises an order of eight and a weight of six as represented below:

$$W(8,6) = \begin{bmatrix} -1 & -1 & 0 & -1 & 0 & -1 & 1 & -1 \\ 1 & 1 & 1 & 0 & 1 & 0 & 1 & -1 \\ 0 & -1 & 1 & 1 & -1 & 1 & 0 & -1 \\ -1 & 0 & 1 & 1 & 1 & -1 & -1 & 0 \\ 0 & -1 & 1 & -1 & 1 & 1 & 0 & 1 \\ -1 & 0 & -1 & 1 & 1 & 1 & 1 & 0 \\ 1 & -1 & 0 & 1 & 0 & -1 & 1 & 1 \\ 1 & -1 & -1 & 0 & 1 & 0 & -1 & -1 \end{bmatrix}.$$

11. The method of claim 1, wherein the weighting matrix is a pseudo-weighting (pW) matrix comprising n×m elements, where m is greater than n.

12. The method of claim 11, wherein the pW matrix comprises an order of seven and a weight of eight as represented below:

$$pW(7,8) = \begin{bmatrix} 1 & 1 & 1 & 1 & 1 & 1 & 1 & 1 \\ 1 & -1 & 1 & -1 & 1 & -1 & 1 & -1 \\ -1 & -1 & 1 & 1 & -1 & -1 & 1 & 1 \\ -1 & 1 & 1 & -1 & -1 & 1 & 1 & -1 \\ -1 & -1 & -1 & -1 & 1 & 1 & 1 & 1 \\ -1 & 1 & -1 & 1 & 1 & -1 & 1 & -1 \\ -1 & -1 & 1 & 1 & 1 & 1 & -1 & -1 \end{bmatrix}.$$

13. The method of claim 1, wherein the weighting matrix is an extended weighting matrix comprising n×m elements, where m is greater than n.

14. The method of claim 1, wherein the plurality of TX electrodes comprises eight TX electrodes and wherein the driving different TX phase sequence of the TX signal comprises driving the different TX phase sequences on four of the eight TX electrodes, wherein the weighting matrix is a distributed weighting matrix as represented below:

$$pM1(8,8) = \begin{bmatrix} 1 & 1 & 1 & -1 & 0 & 0 & 0 & 0 \\ 0 & 0 & 0 & 0 & 1 & 1 & 1 & -1 \\ 1 & 1 & -1 & 1 & 0 & 0 & 0 & 0 \\ 0 & 0 & 0 & 0 & 1 & 1 & -1 & 1 \\ 1 & -1 & 1 & 1 & 0 & 0 & 0 & 0 \\ 0 & 0 & 0 & 0 & 1 & -1 & 1 & 1 \\ -1 & 1 & 1 & 1 & 0 & 0 & 0 & 0 \\ 0 & 0 & 0 & 0 & -1 & 1 & 1 & 1 \end{bmatrix}.$$

15. A capacitance sensing system, comprising:
a memory device; and
a controller coupled to the memory device, wherein the controller is configured to:
drive concurrently a plurality of transmit (TX) signals in different sensing stages on a plurality of TX electrodes of a capacitance sense array to be coupled to the controller, wherein each transmit (TX) signal has a different transmit phase and the different transmit TX phases are defined by an excitation matrix, wherein the excitation matrix is a weighting matrix and wherein the excitation matrix is a square matrix defined by the number of TX electrodes in the plurality of TX electrodes;
measure receive (RX) signals on a plurality of RX electrodes of the capacitance sense array; and determine if an object is proximate to the capacitance sense array based on the measured RX signals.

16. The capacitance sensing system of claim 15, wherein the weighting matrix is at least one of a conference matrix, a Hadamard matrix, a pseudo-weighting matrix, or an extended weighting matrix.

17. The capacitance sensing system of claim 15, wherein each element of the weighting matrix comprises at least one of three states, a one state, a negative one state, or a zero state, wherein the one state and negative one state indicate an excitation of the TX electrodes by the TX signal with the same amplitude, frequency, and form, but with a phase shifted by 180° for the negative one state, and wherein the zero state indicates that the amplitude of the TX signal is zero.

18. A host device, comprising:
a display;
a capacitance sensing array disposed in connection with the display, the capacitance sensing array comprises a plurality of transmit (TX) electrodes and a plurality of receive (RX) electrodes;
a touchscreen controller coupled to the capacitance sensing array, wherein the touch screen controller is configured to:
drive concurrently a plurality of transmit (TX) signals in different sensing stages on a plurality of TX electrodes of a capacitance sense array to be coupled to the controller, wherein each transmit (TX) signal has a different transmit phase and the different transmit TX phases are defined by an excitation matrix, wherein the excitation matrix is a weighting matrix and wherein the excitation matrix is a square matrix defined by the number of TX electrodes in the plurality of TX electrodes;
measure receive (RX) signals on a plurality of RX electrodes of the capacitance sense array; and
determine if an object is proximate to the capacitance sense array based on the measured RX signals.

19. The host device of claim 18, wherein the excitation matrix is at least one of a weighing matrix, a pseudo-weighting matrix, or an extended weighting matrix.

20. The host device of claim 18, wherein each element of the weighting matrix comprises at least one of three states, a one state, a negative one state or a zero state, wherein the one state and negative one state indicate an excitation of the TX electrodes by the TX signal with the same amplitude, frequency, and form, but with a phase shifted by 180° for the negative one state, and wherein the zero state indicates that the amplitude of the TX signal is zero.

* * * * *